(12) United States Patent
Huynh et al.

(10) Patent No.: US 10,747,028 B2
(45) Date of Patent: Aug. 18, 2020

(54) NANOFIBER SHEET

(71) Applicant: Lintec of America, Inc., Richardson, TX (US)

(72) Inventors: Chi Huynh, Richardson, TX (US); Masaharu Ito, Saitama (JP)

(73) Assignee: Lintec of America, Inc., Richardson, TX (US)

( * ) Notice: Subject to any disclaimer, the term of this patent is extended or adjusted under 35 U.S.C. 154(b) by 85 days.

(21) Appl. No.: 15/928,675

(22) Filed: Mar. 22, 2018

(65) Prior Publication Data

US 2018/0210238 A1    Jul. 26, 2018

Related U.S. Application Data

(63) Continuation of application No. 15/800,882, filed on Nov. 1, 2017, now Pat. No. 9,964,783, which is a
(Continued)

(51) Int. Cl.
*B32B 43/00* (2006.01)
*B82Y 40/00* (2011.01)
(Continued)

(52) U.S. Cl.
CPC ............ *G02F 1/0063* (2013.01); *B32B 15/00* (2013.01); *B32B 25/00* (2013.01); *B32B 27/00* (2013.01); *B32B 38/10* (2013.01); *B32B 37/12* (2013.01); *B32B 37/1284* (2013.01); *B82Y 20/00* (2013.01); *B82Y 30/00* (2013.01); *B82Y 40/00* (2013.01); *C01B 32/16* (2017.08); *C01B 2202/08* (2013.01); *C01B 2202/20* (2013.01); *Y10T 156/1168* (2015.01)

(58) Field of Classification Search
CPC ... C01B 32/16; C01B 32/168; C01B 2202/08; Y10T 156/1168
See application file for complete search history.

(56) References Cited

U.S. PATENT DOCUMENTS 6,962,823 B2   11/2005   Empedocles et al.
7,056,409 B2    6/2006   Dubrow
(Continued)

FOREIGN PATENT DOCUMENTS

JP   2004338982       12/2004
JP   2007516093 A      6/2007
(Continued)

OTHER PUBLICATIONS

International Preliminary Report on Patentability, received in PCT Application No. PCT/US2017/036687, dated Dec. 20, 2018, 7 pages.
(Continued)

*Primary Examiner* — Mark A Osele
(74) *Attorney, Agent, or Firm* — Finch & Maloney PLLC

(57) ABSTRACT

A nanofiber sheet is described that is composed of a substrate and a layer of oriented nanofibers. Nanofibers of the sheet can be oriented in a common direction. In some orientations, light absorbent sheets can absorb over 99.9%, and in some cases over 99.95%, of the intensity of light incident upon the sheet. Methods for fabricating a light absorbent sheet are also described.

14 Claims, 21 Drawing Sheets

Related U.S. Application Data continuation of application No. PCT/US2017/036687, filed on Jun. 9, 2017.

(60) Provisional application No. 62/349,339, filed on Jun. 13, 2016, provisional application No. 62/348,423, filed on Jun. 10, 2016.

(51) Int. Cl.

| | | |
|---|---|---|
| *B32B 38/10* | (2006.01) | |
| *G02F 1/00* | (2006.01) | |
| *B32B 15/00* | (2006.01) | |
| *B32B 25/00* | (2006.01) | |
| *B32B 27/00* | (2006.01) | |
| *C01B 32/16* | (2017.01) | |
| *B32B 37/12* | (2006.01) | |
| *B82Y 20/00* | (2011.01) | |
| *B82Y 30/00* | (2011.01) | |

(56) References Cited

U.S. PATENT DOCUMENTS

| | | | |
|---|---|---|---|
| 7,067,328 B2 | 6/2006 | Dubrow et al. | |
| 7,074,294 B2 | 7/2006 | Dubrow | |
| 7,161,285 B2* | 1/2007 | Okamoto | B82Y 10/00 |
| | | | 313/309 |
| 7,273,095 B2 | 9/2007 | Li et al. | |
| 7,344,617 B2 | 3/2008 | Dubrow | |
| 7,641,885 B2 | 1/2010 | Liu et al. | |
| 7,648,406 B2 | 1/2010 | Tai et al. | |
| 7,651,769 B2 | 1/2010 | Dubrow | |
| 7,662,467 B2 | 2/2010 | Li et al. | |
| 7,811,149 B2 | 10/2010 | Liu et al. | |
| 8,007,617 B2 | 8/2011 | Min et al. | |
| 8,128,900 B2 | 3/2012 | Maruyama et al. | |
| 9,067,791 B2 | 6/2015 | Kim et al. | |
| 9,095,639 B2 | 8/2015 | Ajayan et al. | |
| 2005/0062024 A1 | 3/2005 | Bessette et al. | |
| 2005/0066883 A1 | 3/2005 | Dubrow et al. | |
| 2006/0057388 A1 | 3/2006 | Jin et al. | |
| 2007/0090489 A1 | 4/2007 | Hart et al. | |
| 2007/0128960 A1 | 6/2007 | Ghasemi Nejhad et al. | |
| 2007/0207318 A1 | 9/2007 | Jin et al. | |
| 2008/0014465 A1 | 1/2008 | Fearing et al. | |
| 2008/0292835 A1* | 11/2008 | Pan | B81C 99/008 |
| | | | 428/98 |
| 2008/0318049 A1 | 12/2008 | Hata et al. | |
| 2009/0011232 A1* | 1/2009 | Dai | B82Y 30/00 |
| | | | 428/355 R |
| 2009/0066352 A1 | 3/2009 | Grillers et al. | |
| 2009/0126783 A1 | 5/2009 | Lin et al. | |
| 2010/0075201 A1 | 3/2010 | Nakanishi et al. | |
| 2010/0310809 A1 | 12/2010 | Jiang et al. | |
| 2012/0021164 A1 | 1/2012 | Sansom et al. | |
| 2012/0125537 A1 | 5/2012 | Kabir et al. | |
| 2012/0285673 A1 | 11/2012 | Cola et al. | |
| 2013/0118682 A1 | 5/2013 | Zeininger | |
| 2013/0142987 A1 | 6/2013 | Wardle et al. | |
| 2015/0147573 A1 | 5/2015 | Zhang et al. | |
| 2015/0209761 A1 | 7/2015 | Cola | |
| 2015/0291428 A1* | 10/2015 | Wei | C01B 31/0253 |
| | | | 156/249 |
| 2015/0314562 A1 | 11/2015 | Weisenberger | |
| 2015/0360454 A1 | 12/2015 | Wei et al. | |
| 2016/0012975 A1 | 1/2016 | Maruyama et al. | |
| 2016/0362299 A1 | 12/2016 | Inoue et al. | |
| 2018/0052336 A1 | 2/2018 | Huynh et al. | |
| 2019/0077665 A1* | 3/2019 | Maruyama | H05K 7/20009 |

FOREIGN PATENT DOCUMENTS

| | | | |
|---|---|---|---|
| JP | 2007257886 | | 10/2007 |
| JP | 2009091240 A | | 4/2009 |
| JP | 2010285344 A | | 12/2010 |
| JP | 2011046604 A | | 3/2011 |
| JP | 2011219343 A | | 11/2011 |
| JP | 2012076938 A | | 4/2012 |
| JP | 2012111691 A | | 6/2012 |
| JP | 2012188305 | | 10/2012 |
| JP | 2013128323 | | 6/2013 |
| JP | 2014154350 | | 8/2014 |
| TW | 201601230 | | 1/2016 |
| TW | 201710176 | | 3/2017 |
| WO | 2005030636 A2 | | 4/2005 |
| WO | 2005033237 A2 | | 4/2005 |
| WO | 2003068676 A1 | | 6/2005 |
| WO | 2007015710 A2 | | 2/2007 |
| WO | 2012153772 | | 11/2012 |
| WO | 2016201234 | | 12/2016 |
| WO | 2017214474 A1 | | 12/2017 |

OTHER PUBLICATIONS

Extended European Search Report received for EP Application No. 16808378.0, dated Feb. 5, 2019. 12 pages.

Yang, et al., "Adhesion performance of gecko-inspired flexible carbon nanotubes dry adhesive," Downloaded on Jan. 10, 2019 at URL: https://www.spiedigitallibrary.org/conference-proceedings-of-spie. 12 pages.

Jiang, et al., "Room Temperature Transfer of Carbon Nanotubes on Flexible Substrate," EDA Publishing/THERMINIC, Sep. 25-27, 2012, Budapest, Hungary. 4 pages.

Yang, et al., "Multicomponent Interposed Carbon Nanotube Micropatterns by Region-Specific Contact Transfer and Self-Assembling," J. Phys. Chem. B 2003, vol. 107. pp. 12387-12390.

International Preliminary Report on Patentability, received in PCT Application No. PCT/US2018/019396. dated Aug. 27, 2019. 7 pages.

Extended European Search Report received for EP Application No. 17811058.1, dated May 3, 2019. 9 pages.

Non-Final Rejection, received in U.S. Appl. No. 15/179,059, dated Aug. 10, 2018, 13 pages.

Non-Final Office Action for Japanese Patent Application No. 2017-565281, dated Jun. 1, 2018, 7 pages including English translation.

Non-Final Office Action Taiwan Patent Application No. 106119334, dated Jun. 11, 2018, 10 pages including English translation.

International Preliminary Report on Patentability, received in PCT Application No. PCT/US2016/036901, dated Dec. 21, 2017, 8 pages.

International Search Report and Written Opinion, received in PCT Application No. PCT/US16/36901, dated Sep. 1, 2016, 14 pages.

International Search Report and Written Opinion, received in PCT Application No. PCT/US18/19396, dated May 16, 2018, 14 pages.

International Search Report with Written Opinion received in PCT Application No. PCT/US17/036687, dated Oct. 10, 2017, 14 pages.

Taiwan IPO Search Report received for Taiwan Patent Application No. 105118409, dated Mar. 21, 2017, 2 pages.

Yang et al., "Experimental Observation of an Extremely Dark Material Made by a Low-Density Nanotube Array", American Chemical Society, Nano Letters, vol. 8, No. 2, 2008, pp. 446-451, 6 pages.

English Translation of Chinese Office Action received for CH Application No. 201780027765.6. dated Jan. 3, 2020. 21 pages.

"Broadband wavelength-selective reflectance and selective polarization by a tip-bent vertically aligned multi-walled carbon nanotube forest," Journal of Physics D Applied Physics, May 2014. 9 pages.

Su, Shan, "Introduction of Basic Knowledge of Chemistry," Beijing Industry Press, Dec. 2012. p. 21.

Japanese Office Action received for JP Application No. 2018-189824. dated Nov. 12, 2019. 9 pages, including English translation.

* cited by examiner

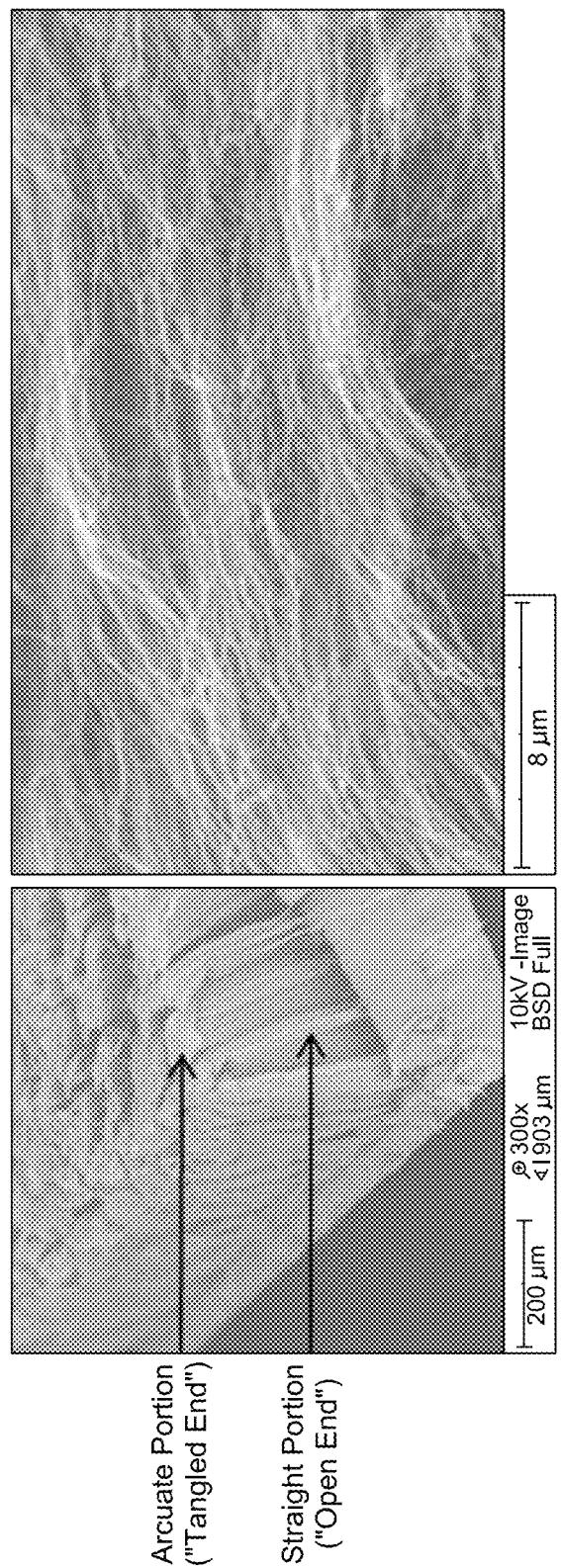

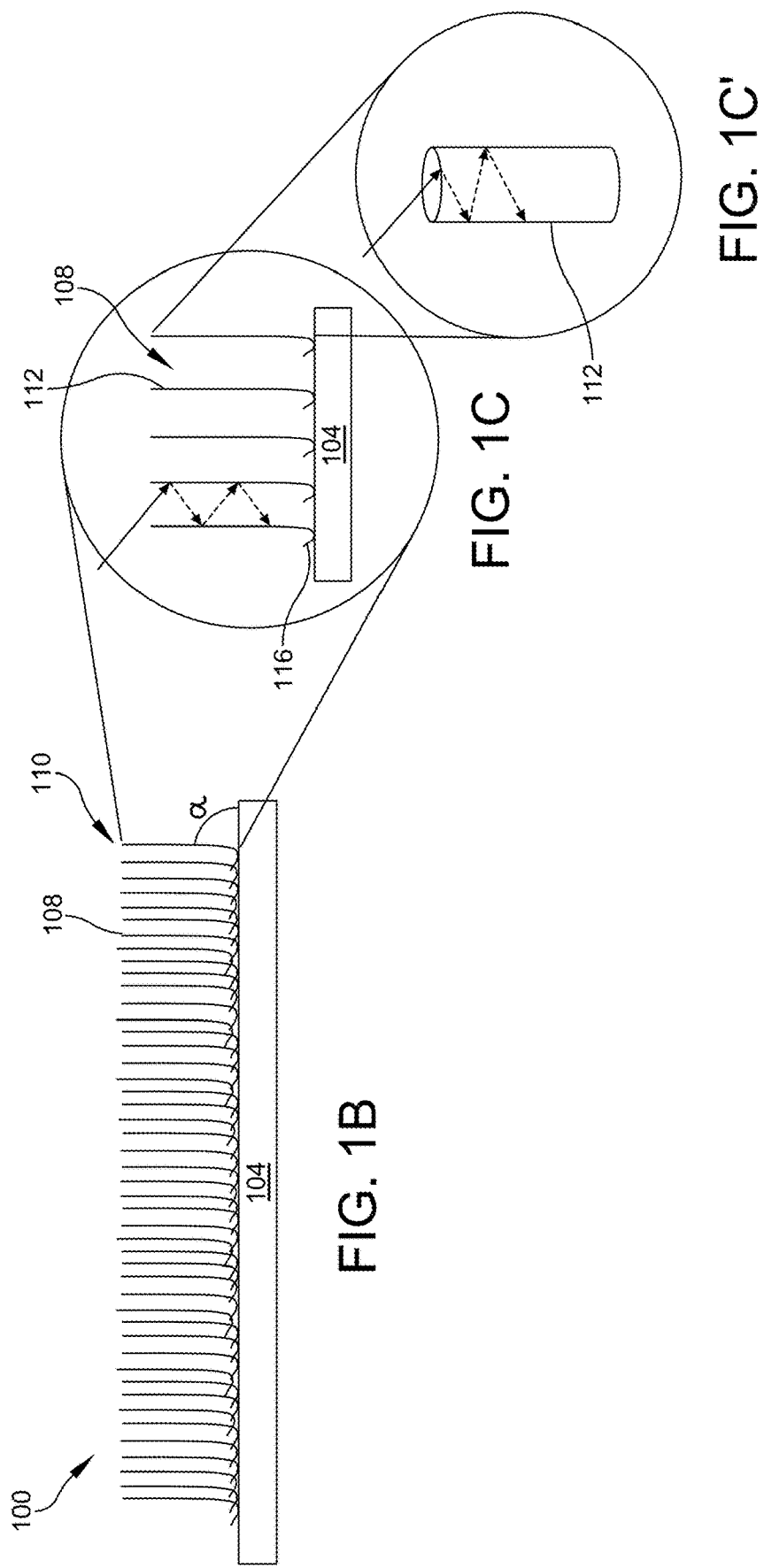

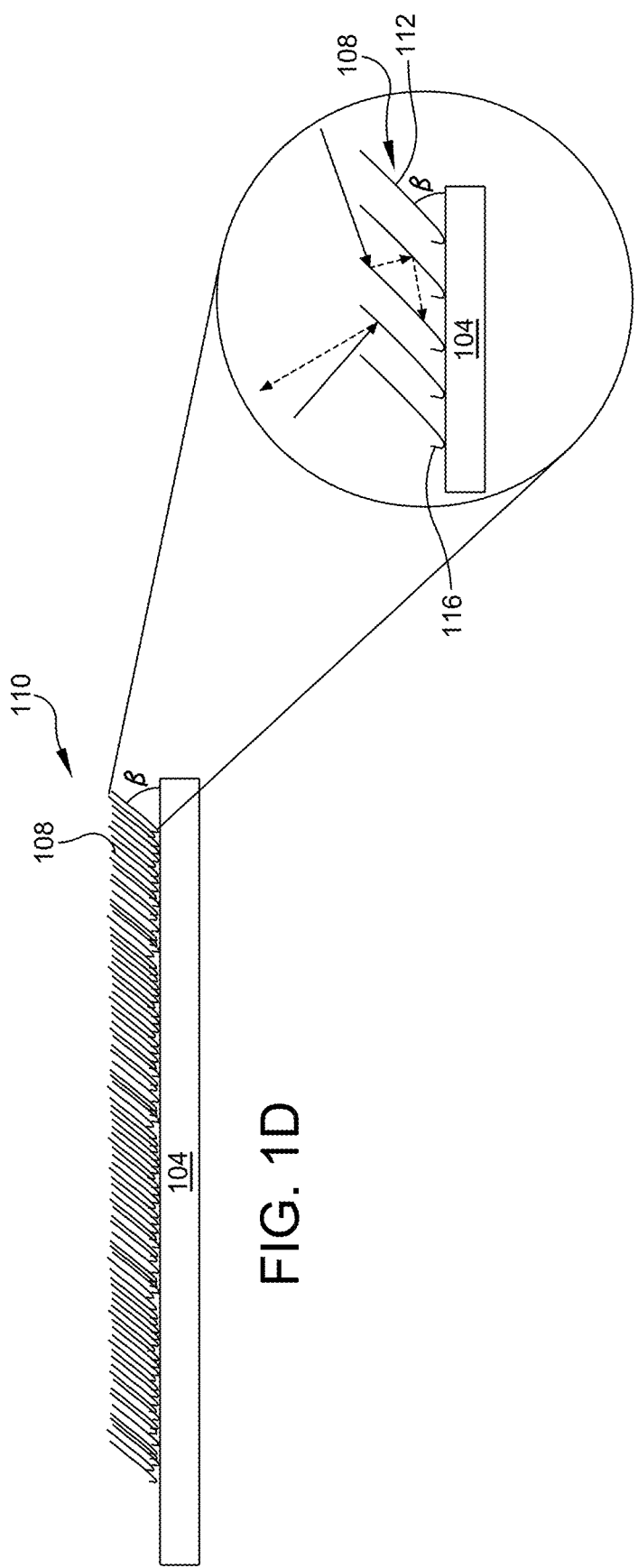

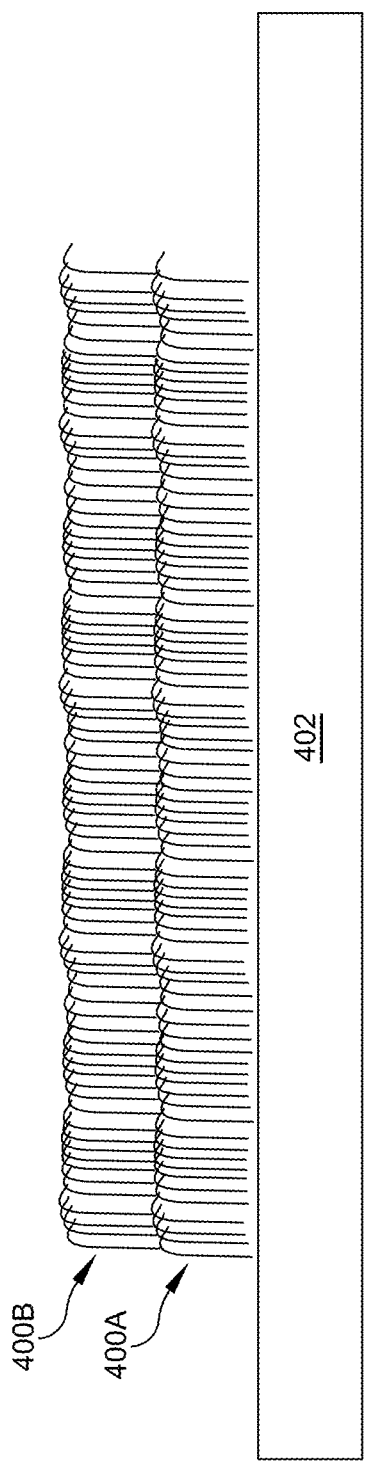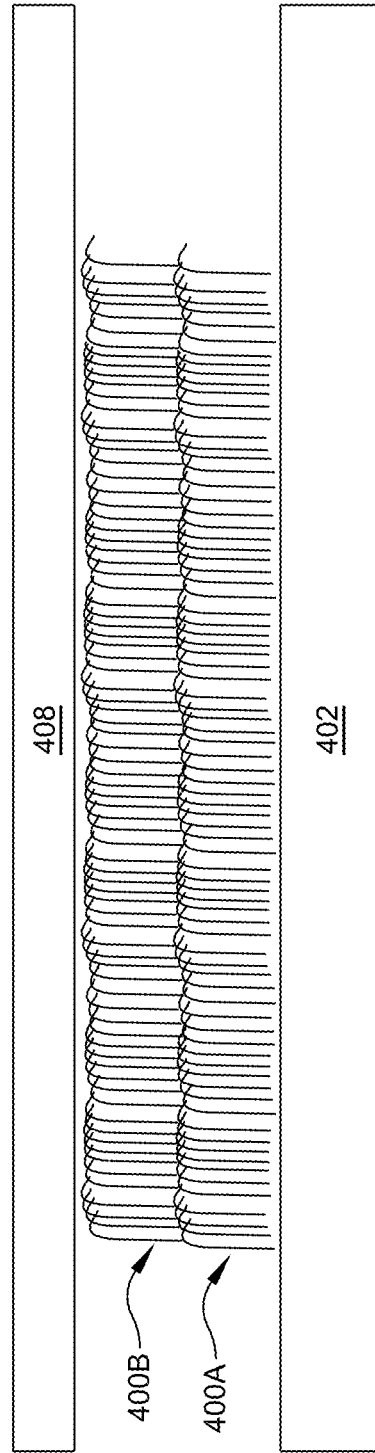

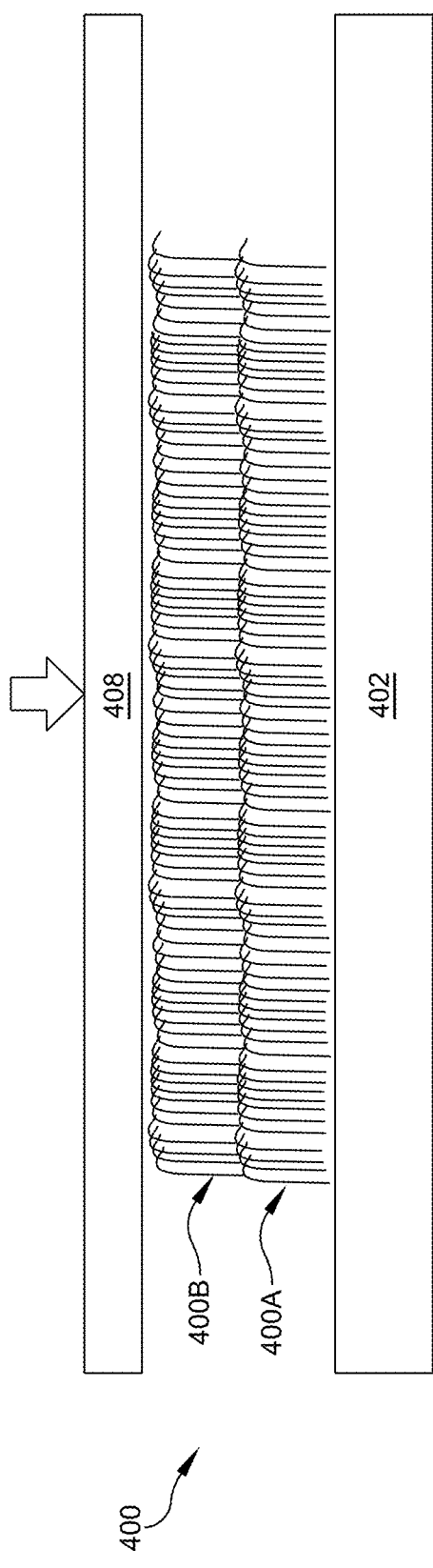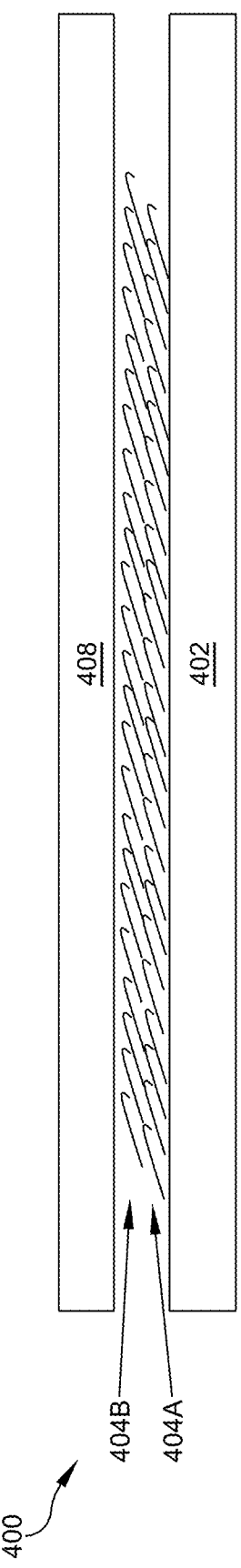

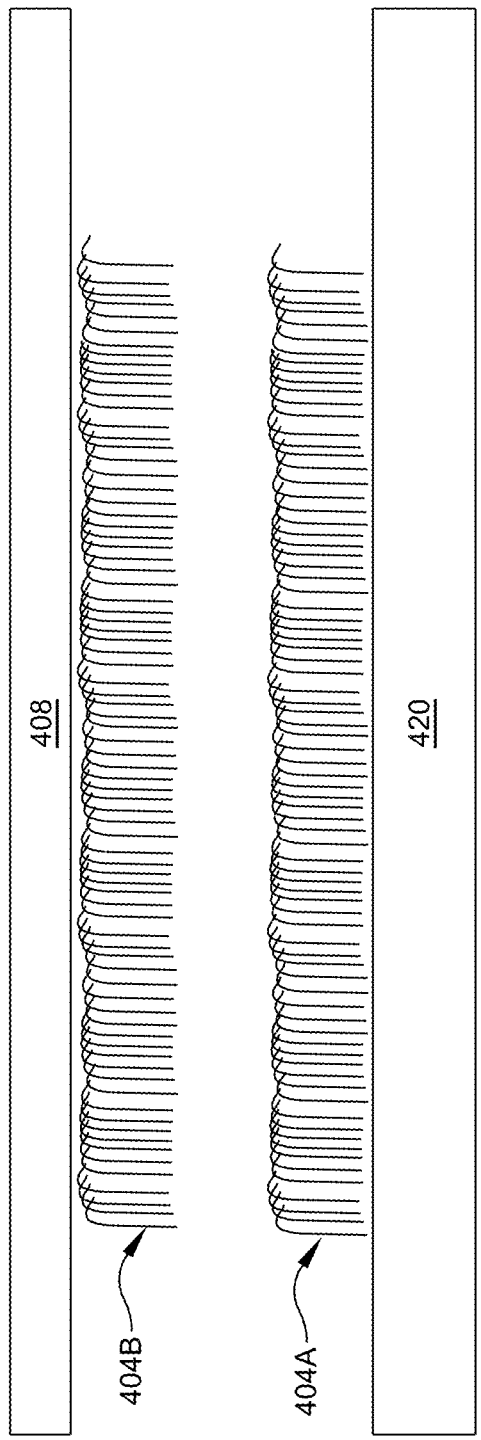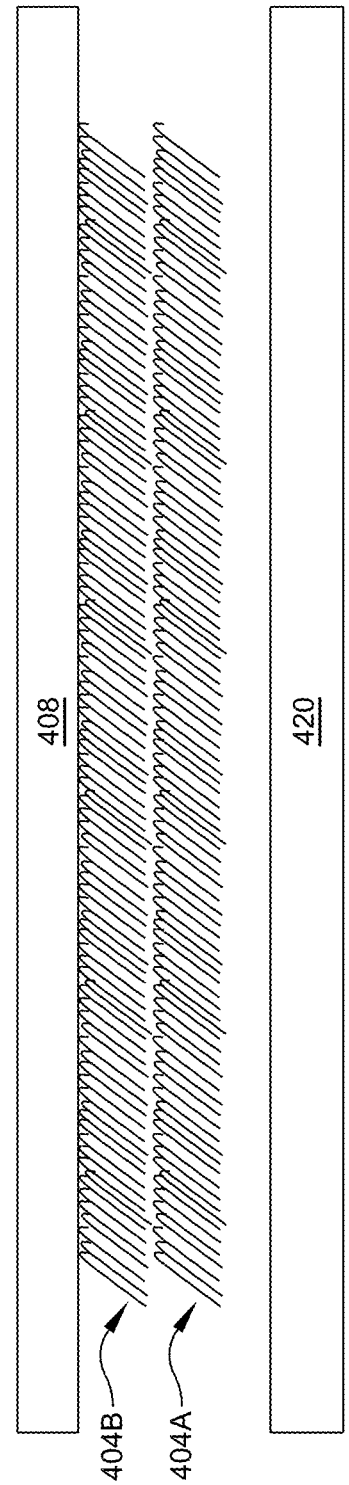

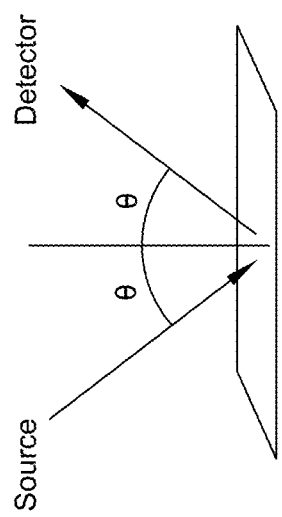
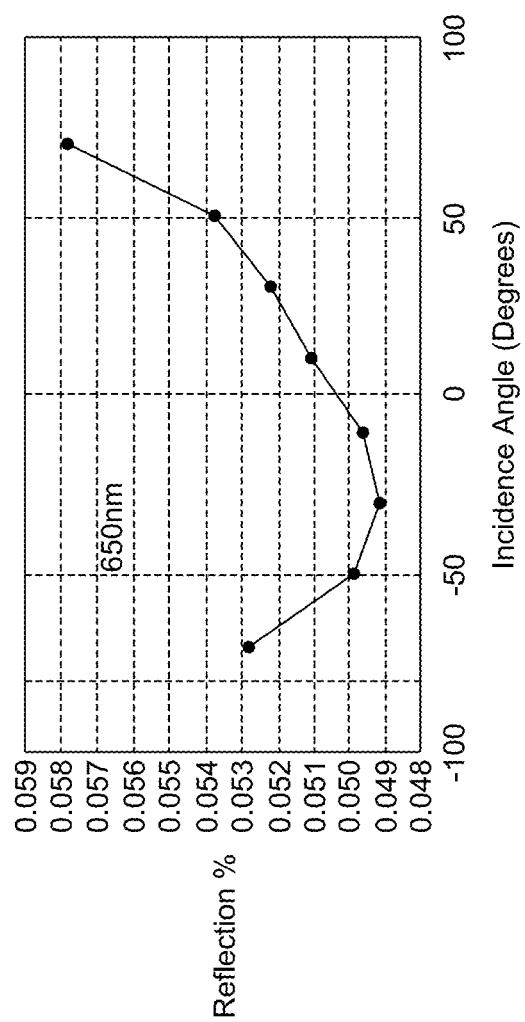
FIG. 5B

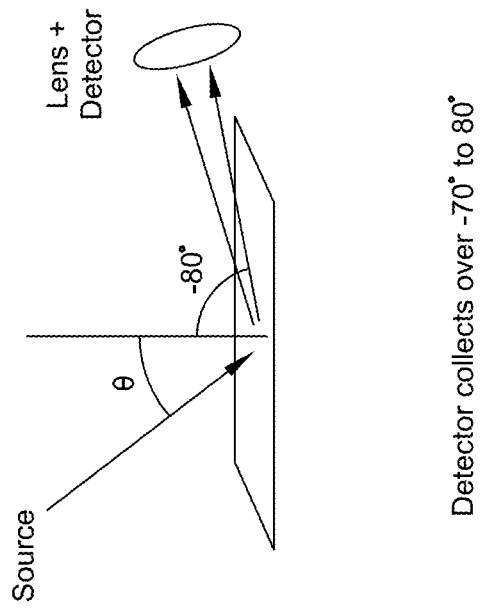
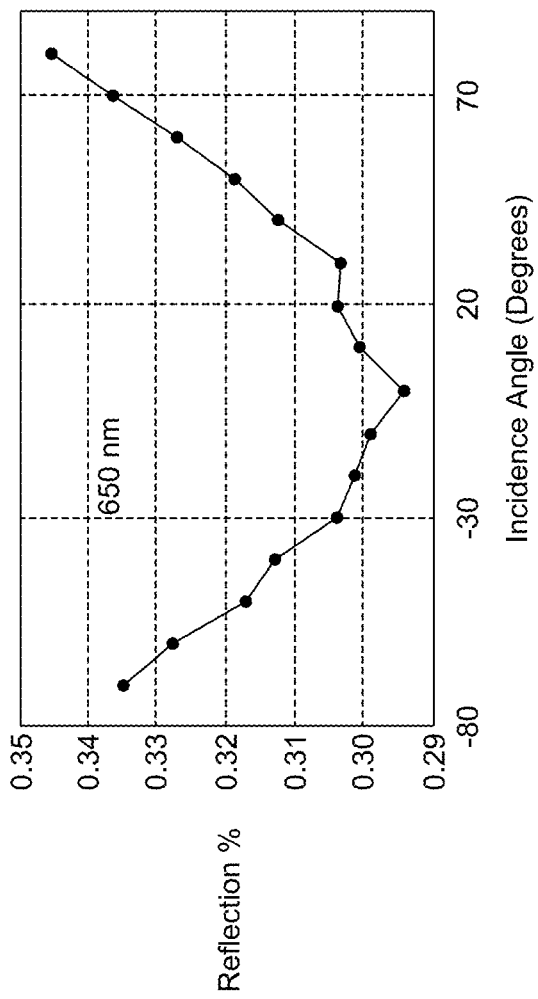
FIG. 5C

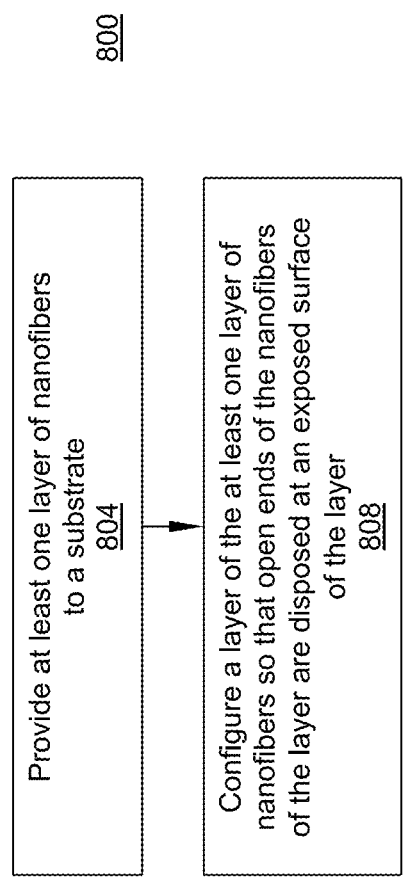

NANOFIBER SHEET

The present application is a continuation of U.S. application Ser. No. 15/800,882 filed on Nov. 1, 2017, which is a continuation application under 35 U.S.C. § 111(a) of PCT Application No. US2017/036687 filed on Jun. 9, 2017, which claims priority to U.S. Provisional Application Nos. 62/348,423, filed on Jun. 10, 2016, and 62/349,339, filed on Jun. 13, 2016, all of which are incorporated herein in their entireties.

TECHNICAL BACKGROUND

The present disclosure relates generally to nanofiber sheets. Specifically, the present disclosure relates to a nanofiber sheet that interacts with various wavelengths of radiation.

BACKGROUND

Surfaces reflect incident light in one or both of two mechanisms. The first mechanism, "spectral reflection," describes the reflection of an incident light ray from a single incoming direction into a single outgoing direction. That is, the incident light ray and the reflected light ray make the same angle with respect to a surface, where the surface is defined either by a reference "normal" to the reflective surface or a plane of the reflective surface. One example of a specular reflective surface is a mirror. The second mechanism, "diffusive reflection," describes the reflection of an incident light ray from a single incoming direction into multiple outgoing directions. That is, an incident light ray, impinging on a diffusively reflective surface, is scattered into multiple outgoing light rays that span a range of outgoing angles with respect to the surface normal (or with respect to the surface plane of the reflective surface).

In some cases, equipment or devices benefits from suppressing reflection or reducing the amount of light reflected.

SUMMARY

An example of the present disclosure includes a nanofiber sheet comprising a substrate; at least one layer of nanofibers on the substrate, at least some of the nanofibers having a straight portion terminating at an open end and an arcuate end opposite the open end, wherein: the straight portions of at least some of the nanofibers are aligned in a common direction; and the open ends of at least some of the nanofibers are disposed at an exposed surface of the layer that is opposite the substrate.

In an embodiment the arcuate end is disposed proximate to the substrate. In an embodiment, the substrate is an adhesive substrate. In an embodiment, an adhesive strength of the substrate is from 2 N/25 mm to 4 N/25 mm. In an embodiment, the adhesive substrate includes a first portion having a first adhesive strength; a second portion having a second adhesive strength; wherein the common direction comprises: a first angle corresponding to the first portion of the adhesive substrate; and a second angle corresponding to the second portion of the adhesive substrate. In an embodiment, the substrate is a growth substrate. In an embodiment, the growth substrate includes a pattern of at least one of a surface of the growth substrate and a catalyst on the surface of the growth substrate, wherein the patterning affects at least one of a density and an orientation of nanofibers. In an embodiment, wherein the at least one layer of nanofibers on the substrate is disposed on the substrate in a pattern. In an embodiment, the common direction is from 20° to 80° with respect to a surface of the substrate. In an embodiment, the common direction is from 30° to 60° with respect to a surface of substrate. In an embodiment, the common direction is perpendicular to a surface of the substrate. An embodiment further includes an emissivity of radiation of at least 96%, the radiation having wavelength from 8 µm to 12 µm at 60° C. In an embodiment, an absorbance of visible radiation incident on the sheet is at least 99.96%. In an embodiment of the preceding embodiment, wherein a wavelength of the incident visible radiation is 650 nm. In an embodiment, the example further comprises an optical device, the optical device comprising: an optical tube; a structural element disposed within the optical tube; and the nanofiber sheet of the preceding example disposed on at least one of an interior of the optical tube and on a surface of the structural element.

An example of the present disclosure comprises an optical tube; a structural element within the optical tube; and a light absorbent sheet disposed on at least one of an interior of the optical tube and the structural element, the light absorbent sheet comprising: a substrate; and a light absorbing layer of nanofibers disposed on the substrate, the nanofibers having open ends disposed at a surface of the light absorbing layer facing the interior of the optical tube. In an embodiment, at least some of the nanofibers have an arcuate end disposed at another surface of the light absorbing layer proximate to the substrate and opposite the surface exposed to the interior of the optical tube. In an embodiment, wherein the optical device is a telescope. In an embodiment, wherein the light absorbing layer of nanofibers absorbs at least 97% of incident visible light. In an embodiment, wherein the light absorbing layer of nanofibers absorbs at least 99.96% of incident visible light. In an embodiment, wherein the nanofibers of the light absorbing layer are oriented in a common direction. In an embodiment, wherein the common direction of the nanofibers is perpendicular to a surface of the structural element. In an embodiment, wherein the common direction of the nanofibers is from 30° to 60° with respect to a surface of the structural element.

An example of the present disclosure includes providing at least one layer of nanofibers on a substrate, a majority of the nanofibers oriented at an angle that is substantially perpendicular to a plane of the substrate; applying an adhesive substrate to an exposed surface of the at least one layer of nanofibers on the substrate; and separating the substrate from the adhesive substrate so that open ends of the nanofibers of the layer are exposed. In an embodiment, the example further includes compressing the at least one layer of nanofibers by applying a compressive force to the substrate and the adhesive substrate. In an embodiment, the example further includes altering an angle of at least a portion of the nanofibers with respect to the plane of the substrate. In an embodiment, wherein applying the adhesive substrate comprises: applying an adhesive to an exposed surface of the at least one layer of nanofibers; and applying a second substrate to the adhesive. In an embodiment, wherein a ratio of adhesive strength of the adhesive substrate to the substrate is in a range from 4:1 to 400:1. In an embodiment, wherein an adhesive strength of the adhesive substrate is greater than an adhesive strength of the substrate. In an embodiment, wherein an adhesive strength of the substrate is greater than an adhesive strength of the adhesive substrate. In an embodiment, wherein a difference between an adhesive strength of the adhesive substrate and an adhesive strength of the substrate is 2 N/25 mm.

An example of the present disclosure includes providing a layer of nanofibers on a substrate; applying a second adhesive substrate to an exposed surface of the layer of nanofibers; orienting the nanofibers of the layer by applying a compressive force to the layer; and separating the substrate and the second adhesive substrate, the separating re-orienting the nanofibers of the layer in a common direction.

In an embodiment, the substrate is a growth substrate. In an embodiment, wherein the substrate includes a patterned surface. In an embodiment, wherein the growth substrate includes a pattern disposed on a surface of the growth substrate. In an embodiment, wherein the substrate is a first adhesive substrate. In an embodiment, wherein the first adhesive substrate includes a pattern comprising a first adhesive strength and a second adhesive strength different from the first adhesive strength. In an embodiment, wherein the second adhesive substrate includes a pattern of a third adhesive strength and a fourth adhesive strength different from the third adhesive strength. In an embodiment, further comprising selecting: an adhesive strength of the first adhesive substrate in a range of 2 N/25 mm to 4 N/25 mm; and an adhesive strength of the second adhesive substrate in a range of 0.1 N/25 mm to 0.5 N/25 mm. In an embodiment, wherein the common direction is perpendicular to a surface of the second adhesive substrate. In an embodiment, wherein the common direction is from 20° to 80° with respect to a surface of the second adhesive substrate. In an embodiment, further comprising providing a first layer of nanofibers on the substrate and a second layer of nanofibers on the first layer of nanofibers; and in response to the separating, the first layer disposed on the substrate and the second layer disposed on the second adhesive substrate. In an embodiment, wherein after the separating, the layer of nanofibers re-oriented in a common direction has a visible light absorbance of at least 97%. In an embodiment, wherein after the separating, the layer of nanofibers re-oriented in a common direction has a visible light absorbance of at least 99.96%. In an embodiment, wherein the visible light absorbed has a wavelength of 650 nm. In an embodiment, further comprising selecting: an adhesive strength of the first adhesive substrate to be in a range of 2 N/25 mm to 4 N/25 mm; and an adhesive strength of the second adhesive substrate in a range of 0.01 N/25 mm to 0.05 N/25 mm. In an embodiment, further comprising selecting a ratio of an adhesive strength of the first adhesive substrate to an adhesive strength of the second adhesive substrate in a range from 4:1 to 400:1. In an embodiment, wherein a difference of adhesive strength of the second adhesive substrate to the substrate is 2 N/25 mm.

BRIEF DESCRIPTION OF THE DRAWINGS

FIG. 1A is a perspective view scanning electron microscope (SEM) image of a carbon nanotube forest (alternatively referred to herein as a "layer") having a plurality of individual nanotubes, each of which includes a straight portion and an arcuate portion, in an embodiment.

FIG. 1A' is a plan view SEM image of a tangled portion of a carbon nanotube forest, in an embodiment.

FIG. 1B is a schematic illustration of a nanofiber sheet including a substrate and a plurality of nanofibers disposed on the substrate, in an embodiment.

FIG. 1C is a schematic magnification of a portion of the nanofiber sheet shown in FIG. 1B, in which the individual nanofibers have a straight portion and an arcuate portion, and are oriented to absorb light in the spaces between the fibers, in an embodiment.

FIG. 1C' is a schematic illustration of a straight portion of an individual nanofiber of the nanofiber sheet shown in FIGS. 1B and 1C, in which light is absorbed within a hollow nanofiber, in an embodiment.

FIG. 1D is a schematic illustration of a nanofiber sheet including a substrate and a plurality of nanofibers disposed on the substrate at an angle between 30° and 60° with respect to a surface of the substrate, in an embodiment.

FIG. 1E is a schematic magnification of a portion of the nanofiber sheet shown in FIG. 1D, in which the individual nanofibers have a straight portion and an arcuate portion, and are oriented to absorb light in the spaces between the fibers, in an embodiment.

FIGS. 4A to 4H schematically illustrate the nanofiber sheet at various stages of fabrication, in embodiments.

FIG. 5B is reflectance data of a carbon nanotube forest prepared according to embodiments of the present disclosure, in which open ends of the nanofibers are located at an exposed surface of the nanofiber layer as schematically illustrated in FIG. 1B, in an embodiment.

FIG. 5C is reflectance data of a reference carbon nanotube forest in which the nanotubes are disposed on their growth substrate and oriented 30° with respect to a surface of the substrate, in an embodiment.

FIG. 8 is a method flow diagram for a method of fabricating a nanofiber sheet of the present disclosure, in an embodiment.

Figure 2C:
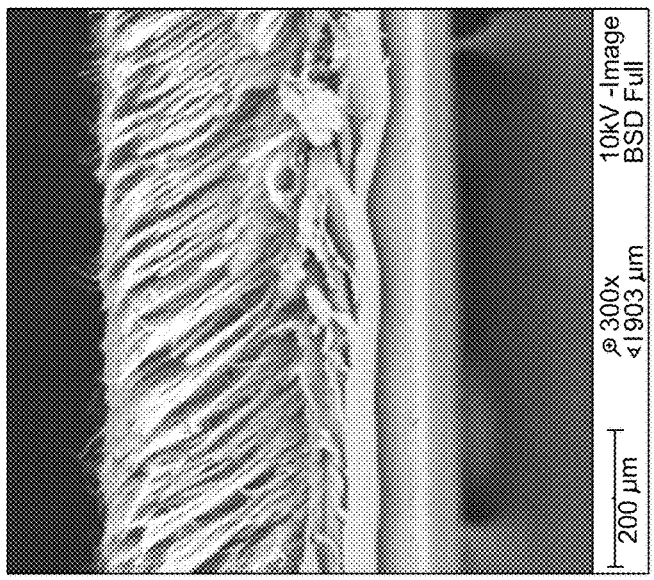
FIGS. 2A-2G are cross-sectional views of carbon nanotube forests in which individual nanotubes comprising the various forests have been angled with respect to a surface of the substrate using techniques described herein, in embodiments.
Figure 2B:
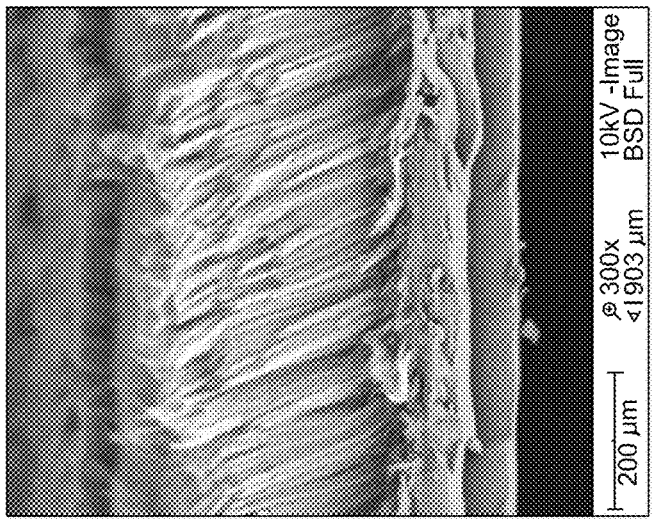
Figure 2A:
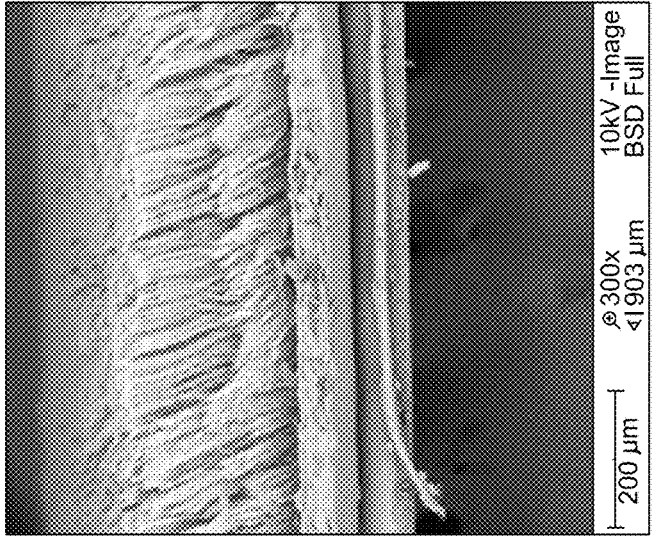
Figure 2F:
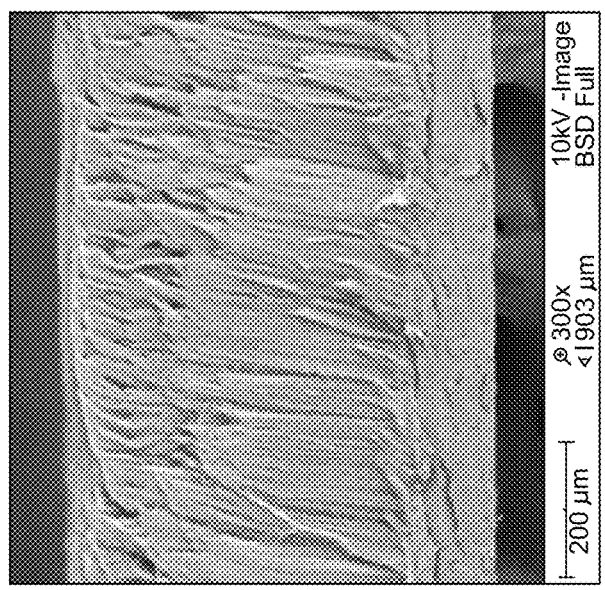
Figure 2E:
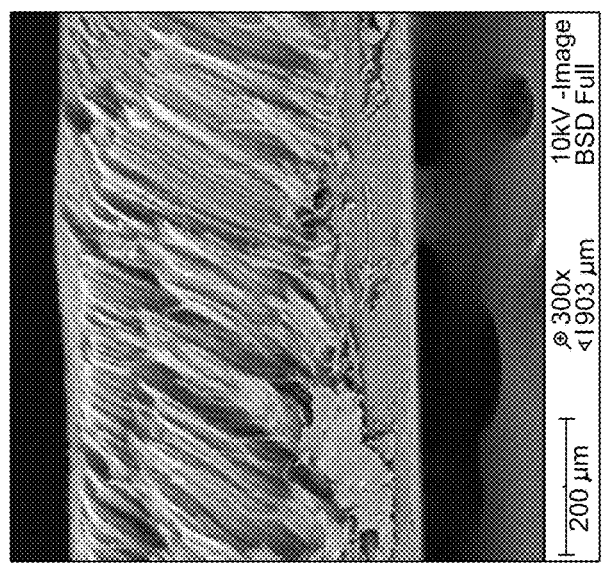
Figure 2D:
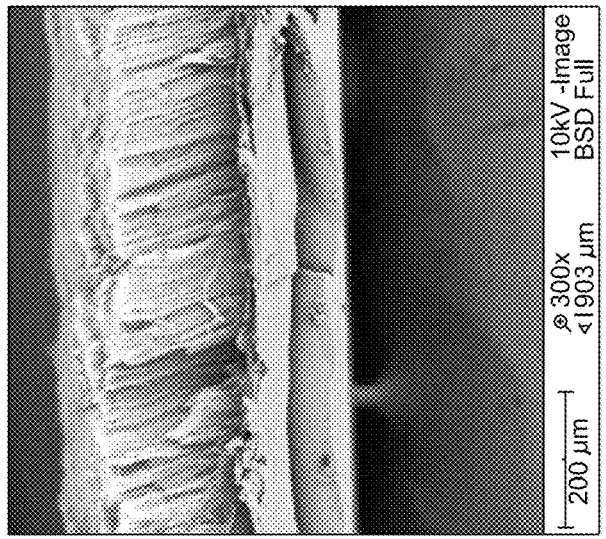

The figures depict various embodiments of the present disclosure for purposes of illustration only. Numerous variations, configurations, and other embodiments will be apparent from the following detailed discussion.

DETAILED DESCRIPTION

Overview

As used herein, the term "nanofiber" means a fiber having a diameter less than 1 µm. Both carbon-based materials (e.g., carbon nanotubes) and non-carbon-based materials may be considered "nanofibers" for the purposes of this disclosure. As used herein, the term "carbon nanotube" encompasses both single walled carbon nanotubes and/or multi-walled carbon nanotubes in which carbon atoms are linked together to form a cylindrical structure. In some embodiments, carbon nanotubes as referenced herein have between 4 and 10 walls. The dimensions of carbon nanotubes can vary greatly depending on production methods used. For example, the diameter of a carbon nanotube may be from 0.4 nm to 100 nm and its length may range from 10 µm to longer than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or tunable. While many intriguing properties of carbon nanotubes have been identified, harnessing the properties of carbon nanotubes in practical applications requires scalable and controllable production methods that allow the features of the carbon nanotubes to be maintained or enhanced.

Embodiments described herein include a nanofiber sheet that interacts with a variety of wavelengths of radiation. For example, embodiments disclosed herein have unexpectedly high absorbance (and therefore unexpectedly low reflectivities) of radiation wavelengths in the optical band (from about 400 nm to about 800 nm). In other examples, embodiments disclosed herein have unexpectedly high emissivities of radiation wavelengths in the infra-red band (from about 700 nm to about 1 mm).

Some of the embodiments described herein are composed of a substrate and a layer of oriented nanofibers. In some embodiments, the nanofibers are substantially aligned with each other but are not aligned with the plane of the sheet. For example, the nanofibers may be oriented between 20 and 90 degrees from the plane of the sheet. While the embodiments herein are primarily described as fabricated from carbon nanotubes, it will be appreciated that other carbon allotropes, whether graphene, micron or nano-scale graphite fibers and/or plates, and even other compositions of nano-scale fibers may be used to fabricate nanofiber sheets using the techniques described below. Nanofiber sheets of the present disclosure can absorb over 99.9%, and in some cases over 99.95%, of incident light intensity. In other words, the nanofiber sheet reflects approximately 0.1%, or less (in some embodiments as low as 0.04%), of incident light. Methods for fabricating a nanofiber sheet are also disclosed herein.

Nanofibers (or other nano-scale materials) used to fabricate embodiments of nanofiber sheets, as described herein, are disposed on a substrate and are aligned in a common direction. In one embodiment, the common direction is 90° to the underlying substrate. In another embodiment, the common direction is between 30° and 60° relative to (or equivalently with respect to) the underlying substrate.

In one embodiment, aligning the nanofibers in a first common direction occurs by compressing the fibers between substrates so that a longitudinal axis of a fiber is more aligned (i.e., has a component of orientation parallel) with a surface of the substrates. This is contrast to nanofibers that, for example, are often oriented perpendicularly to a surface of a substrate in an as-deposited or as-grown state. The fibers are oriented in a second common direction by applying a tensile force to the compressed fibers. This tensile force is transmitted to the fibers through an adhesive disposed on the substrates or by a substrate that inherently adheres to the nanofibers (rather than being adhesive through a separate adhesive layer). The tensile force, in cooperation with the adhesion of the substrate, pulls the nanofibers to the second common direction from the as-compressed orientation. In examples, the second common direction is less aligned with the plane of (i.e., more perpendicular to) an underlying substrate compared to the first common direction achieved by compression of the nanofibers. In some examples, the second common direction is approximately perpendicular to a substrate. In other examples, the second common direction of the aligned straight ends of nanofibers is between approximately 20° and approximately 80° or between approximately 30° and approximately 60° with respect to a substrate on which the nanofibers are disposed (where "approximately" refers to imprecision in measurement instruments and techniques and natural variation in individual angles, which in total is +/−10% of the measured value).

As used herein, the angle of a nanofiber with respect to a substrate is the angle formed between a plane of a major surface of the substrate at the point of contact with a nanofiber and a straight line connecting the base (proximal end) of the nanofiber with the distal end of the fiber.

Embodiments disclosed also include methods to control an angle of orientation of nanofibers with respect to an underlying substrate surface. This is beneficial for at least the reason that the angle of nanofiber orientation can be selected, and in some examples patterned, to maximize the radiation (generically referred to as "light" herein) absorption (and in some applications, infra-red (IR) emissivity) for any of a variety surfaces to which the nanofiber sheet is attached. That is, the angle of the nanofibers can be configured with respect to a direction of incident radiation regardless of the orientation of the underlying surface to the incident radiation. This is particularly helpful for curved or textured surfaces. This ability to select and/or pattern an orientation of nanofibers of a layer separately from the orientation of an underlying surface is unusual given that typically fabricated nanofiber sheets include nanofibers that are either perpendicular to a growth substrate or parallel to a growth substrate.

Embodiments disclosed herein also include methods of fabricating the nanofiber sheet. In one example, layers of nanofibers within a multi-layer (e.g., at least two-layer) stack of nanofibers are separated from one another. This separation exposes the "open" ends of nanotubes oriented in a common direction in one or both of the layers. These open ends can receive incident radiation. By exposing a surface at which the "open" ends of aligned nanofibers are disposed, a nanofiber sheet of the present disclosure possesses an unusually and unexpectedly high light absorbance, and correspondingly unexpectedly low reflectivity. In some examples, the orientation of individual nanofibers within a layer of nanofibers can be determined, in part, by the adhesive strength of an adhesive that is used to separate the adjacent layers of nanofibers. The stronger the adhesive, the greater the force pulling the nanofibers upward from the substrate and the closer to perpendicular the nanofibers are relative to a plane defined by a surface of a substrate. The weaker the adhesive, the closer the angle is to 30° relative to the plane defined by the surface of the substrate. In some examples, selecting the relative adhesive strength of the first substrate compared to the second substrate is used to determine orientation of the nanofibers on the substrates.

As mentioned above, using techniques of the present disclosure enables the angle of nanofibers to be controlled (and selected) to align with the incident radiation so that a maximum amount of radiation is absorbed regardless of the orientation to incident light of an underlying surface to which the nanofiber sheet is attached. Different portions of the same forest can be oriented at different angles by, for example, using a substrate having a pattern of varying adhesive strength along the length and/or width of the substrate. A pattern of nanofibers (whether a pattern of differently orientated and/or angled nanofibers or a pattern of areas of nanofibers and areas lacking nanofibers) may also be created by patterning a growth substrate itself, a catalyst on a growth substrate, an adhesive layer, and combinations thereof.

Applications for embodiments described herein are varied. Example applications include a light absorbent sheet used for light-sensitive applications, such as for telescopes (whether terrestrially-based or satellite-based), optical microscopes, cameras or other optical instruments for which the removal of reflected light within the instrument improves resolution, clarity, and/or other operational feature. Similarly, other example applications include interferometers and other scientific equipment that measures light and can benefit (e.g., from improved accuracy) from reducing reflection internal to the equipment and/or use of an unexpectedly highly emissive and/or radiation absorbent surface. Analogously, because of the high degree of light absorbance, portions of material can be used in some examples as a calibration tool for optical equipment. In other examples, because of the very high portion of incident light absorbed and the deep black color caused by absorbance of at least 97%, and in some examples, at least 99.95% of incident visible light, the light absorbent material can be used to fabricate visually appealing elements of products benefiting from a deep black appearance, such as desk stands or artwork. In other applications, a nanofiber sheet is fabricated and applied for its high IR emissivity.

Configuration of Nanofibers within a Layer of the Sheet

Nanofibers that comprise a radiation interactive sheet of the present disclosure ("nanofiber sheet" for brevity) typically have two portions in their as-deposited form (prior to applying fabrication methods described below that increase the fraction of incident light absorbed by the sheet). With reference to FIGS. 1A and 1A', one portion is a "straight portion" (that terminates in an "open end"). The straight portion typically connects to, and is disposed near, a growth substrate in an as-growth state of a nanofiber forest. The second portion of a nanofiber is "an arcuate portion" (also sometimes referred to as a "tangled end") and is at an opposite end of the nanofiber from the open end. Generally the tangled end is disposed at an exposed surface of the nanofiber layer opposed the growth substrate. The tangled end bends away from a longitudinal axis of the straight portion. These ends are indicated in the scanning electron microscope (SEM) image of FIG. 1A taken at a magnification of approximately 300× and an accelerating voltage of 10 kV. FIG. 1A' is a top view of a nanofiber layer and shows the tangled nature of the arcuate portions.

In the as-deposited form shown in FIGS. 1A and 1A', the arcuate portions of the nanofibers partially block access to the open spaces between the nanofibers and disposes outer walls of the nanofibers at the exposed surface of the sheet. As a result, this as-deposited configuration of nanofibers has a relatively high (e.g., greater than 1%) reflectivity and relatively low absorbency (less than 99%) of incident light. It is believed that the as-deposited configuration has a high reflectivity for at least two reasons: (1) the inter-fiber spaces, and in some cases the intra-fiber chambers, are blocked by the arcuate portions; and (2) the amount of reflective surfaces (namely the outer surfaces of nanofibers) at the exposed surface of the nanofiber layer is increased.

One feature of some embodiments of the present disclosure is that, unlike as-deposited nanofiber layers, an exposed surface of the nanofiber layer is not tangled but rather "open." That is, an exposed surface of a nanofiber layer is comprised of at least one of (1) straight (and in some cases aligned) portions of the nanofibers and (2) ends of nanotubes that are at least partially un-occluded (e.g., by arcuate ends, walls or fragments of nanofibers, catalyst particles). In one embodiment, disposing open ends of nanofibers at an exposed surface is accomplished by "flipping" the orientation of nanofibers from that found in the as-deposited state using adhesive substrates. In another embodiment, this configuration is accomplished by removing the arcuate portions (e.g., by laser, cutting, or pulling off arcuate portions using an adhesive substrate). Regardless, this configuration (and methods of fabrication used to achieve this configuration) improves the radiation absorbance of the nanofiber sheet by increasing exposure of inter-nanofiber spaces to incident light and, for the case of nanotubes intra-fiber chambers, by opening the intra-fiber chambers to incident radiation thus increasing the proportion of light that is absorbed. It has also been found that the IR emissivity is also unexpectedly high for embodiments with nanofibers in this configuration.

FIG. 1B schematically illustrates one example of a nanofiber sheet of the present disclosure in which nanofibers are oriented perpendicularly (i.e., at approximately 90°) to a surface of an underlying substrate with open ends exposed. This is not an as-grown configuration, but rather illustrates an embodiment in which the nanofiber sheet has been transferred to a secondary substrate that is not the growth substrate. As shown, a nanofiber sheet 100 includes a substrate 104 and a plurality of individual nanofibers 108 in a nanofiber layer 110 disposed on the substrate 104. In the embodiment shown in both FIG. 1B and FIG. 1C, each individual nanofiber 108 includes a straight portion 112 (corresponding to a "longitudinal axis" of each fiber), the open end of which is disposed at an open end of a nanofiber (in other words, the straight portion 112 terminates at an open end of the nanofiber). Some or all of the nanofibers are oriented relative the underlying substrate 104 at an angle α, which is approximately 90°.

The open ends of the nanofibers are disposed proximate to an exposed surface of the layer 110 (i.e., opposite the substrate 104). As indicated above, this orientation is generally opposite that of nanofibers in an as-growth state because the open ends are usually proximate to the substrate 104 rather than at the exposed surface of the layer 110. Individual nanofibers 108 also includes an arcuate portion 116 integral with the straight portion 112 and disposed at a second end of the nanofiber 108. The arcuate portion 116 is proximate to the substrate 104 and opposite to the open end of the nanofiber 108. The arcuate portion 116 is included only for illustration of one embodiment and it will be appreciated that depending on the method used to fabricate the layer 100, arcuate portions 116 may be removed or otherwise absent. In an embodiment, more than 50% of the open ends and straight portions at an exposed surface are within 30° of each other and the common direction, no more than 45° from a vector normal to the surface of the substrate, or combinations thereof.

As described above and schematically shown in FIG. 1C, by orienting some or all of the individual nanofibers 108 of the layer 110 in this way, incident radiation (illustrated by arrows) may enter the spaces between the individual nanofibers 108 (or in some cases enter an intra-fiber chamber defined by a nanofiber itself). These inter-fiber spaces and intra-fiber chambers can receive incident radiation (e.g., optically visible light) because access to the spaces is not blocked by the arcuate portions 116 of the individual nanofibers, particles of growth catalyst, or even by other straight portions 112. Intra-fiber chambers, corresponding to an inside diameter of a nanofiber, can have inside diameters within any of the following ranges: from 1 nm to 100 nm; from 1 nm to 10 nm; from 1 nm to 5 nm; from 10 nm to 50 nm; from 50 nm to 100 nm; from 25 nm to 75 nm; from 75 nm to 100 nm. As shown by dashed lines and arrows in FIG. 1C and FIG. 1C', even incident light that is initially reflected from a nanofiber 108, the orientation of nanofibers 108 in the described embodiments is such that incident light is reflected deeper into the inter-fiber spaces or intra-fiber chambers, until the light is ultimately absorbed. Thus reflectivity of the nanofiber sheet is reduced to less than 0.25%, less than 0.15%, less than 0.10% or less than 0.05% in some embodiments.

FIG. 1C' is an illustration of light being absorbed within an individual nanofiber, in this case a hollow carbon nanotube, in an embodiment. Analogous to a mechanism described above, light can enter an open end of a nanofiber 108, and thus enter a chamber defined by the walls of an individual nanofiber. Once light has entered a chamber of a nanofiber, it is either absorbed promptly or reflected deeper into the nanofiber until it is finally absorbed. While not wishing to be bound by theory, it will be understood that either of the light absorption mechanisms described herein, among others, can cause the unexpectedly high light absorption of some of the embodiments described herein.

As schematically shown in FIGS. 1D and 1E, in embodiments an angle β of nanofibers with respect to a substrate can be selected from, for example, 30° to 90°. The schematic depictions of FIGS. 1D and 1E illustrate images of experimental examples shown in FIGS. 2A to 2G. FIGS. 2A to 2G are SEM images (300× magnification at 10 kV of accelerating voltage) of nanofiber sheets in cross-section, each of which has a nanofiber angle from 60° and 90°. Sheets with nanofibers oriented at an angle from 30° to 90° can be beneficial in some applications because the nanofiber orientation can be selected to maximize incident light absorption independent of the angle of an underlying surface with respect to the incident light. Methods for manufacturing a nanofiber layer 110 in these configurations are described below.

Methods for Fabricating a Nanofiber Sheet

Figure 3:
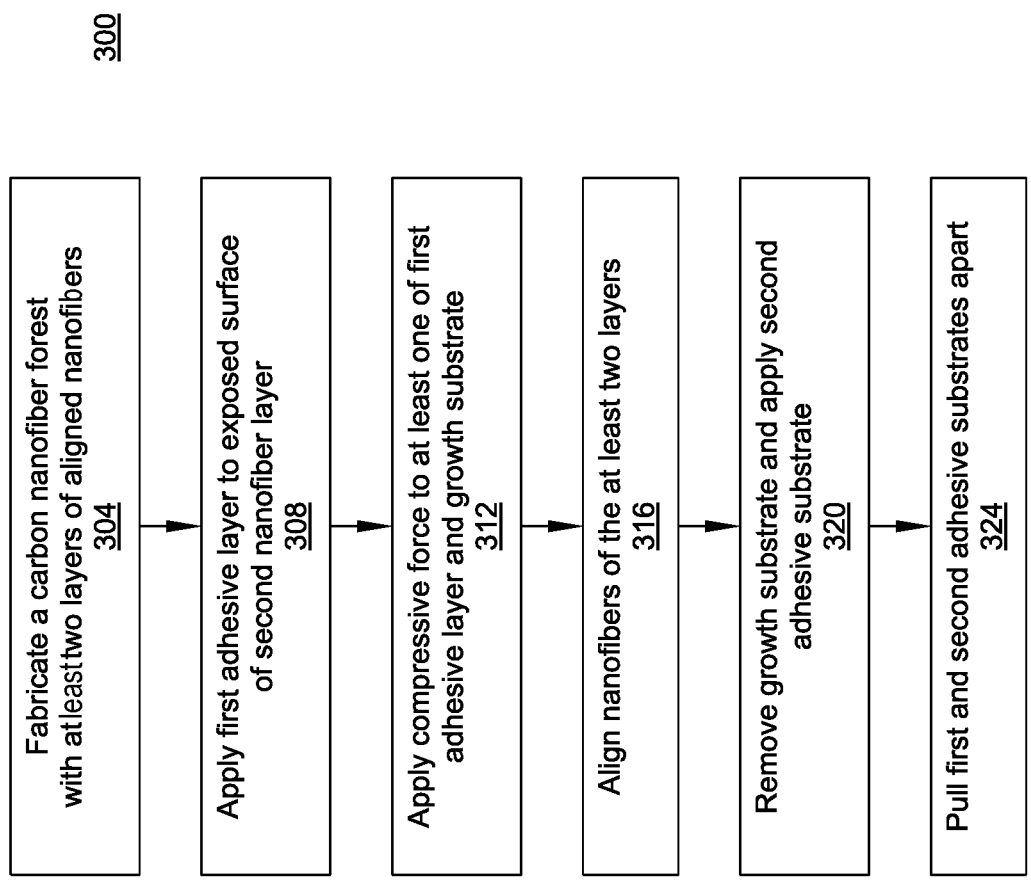
FIG. 3 is a method flow diagram for a method of fabricating a nanofiber sheet of the present disclosure, in an embodiment.

A nanofiber sheet, such those shown in FIGS. 1A, and 2A-2G, and schematically illustrated in FIGS. 1B to 1E, is fabricated by an example method 300, elements of which are shown in the method flow diagram of FIG. 3. Schematic illustrations of the various stages of the method 300 appear in FIGS. 4A to 4H to facilitate explanation of the method.

The method 300 begins with fabrication 304 of a carbon nanofiber stack having at least two distinct layers of nanofibers. Fabrication 304 of a single layer carbon nanofiber forest is disclosed in, for example, PCT Patent Application Publication No. WO2007/015710, which is incorporated by reference herein in its entirety. The forest is a precursor to embodiments described herein that can be used to produce nanofiber sheets, as described below in more detail. As used herein, a forest (or a layer) of nanofibers or carbon nanotubes refers to an array of nanofibers having approximately equivalent dimensions that are arranged substantially parallel to one another on a substrate where a longitudinal axis of at least 90% of the nanofibers is substantially perpendicular to a surface of the substrate on which the nanofibers are disposed.

In some embodiments, the nanofibers of the forest may each be oriented with respect to a growth surface of the substrate at a common angle that is greater than or less than 90°. For example, the nanofibers of the forest may be angled between 45° and 135° in relation to the surface of the substrate. In particular embodiments, the nanofibers of the forest may be oriented between 75° and 105° from the surface of the substrate and in select embodiments the nanofibers may be oriented approximately 90° from the substrate.

Nanofiber forests as disclosed herein may be relatively dense. Specifically, the disclosed nanofiber forests may have a density of approximately 10 billion to 30 billion nanofibers/$cm^2$. In some specific embodiments, a nanofiber forest as described herein may have a density of between 15 billion and 25 billion nanofibers/$cm^2$. The forest may include areas of high density or low density and specific areas may be void of nanofibers. These variations can be accomplished by selectively patterning a catalyst on the growth substrate (which in some embodiments is stainless steel) to select the density, height and other physical dimensions, and electrical, mechanical, and optical properties of the forest on the substrate. The nanofibers within a forest may also exhibit inter-fiber connectivity. For example, neighboring nanofibers within a nanofiber forest may be attracted to one another by van der Waals forces. Various methods can be used to produce nanofiber forests in accordance with the subject disclosure. For example, in some embodiments nanofibers may be grown in a high-temperature furnace. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, $SiO_2$, glass ceramics). In examples where the nanofibers of the forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

The reaction conditions during nanofiber growth can be altered to adjust the properties of the resulting nanofiber forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having desired patterning. For example, in some embodiments catalyst is deposited on the substrate in a pattern and the resulting forest grown from the patterned catalyst is similarly patterned. Example catalysts include iron with a, buffer layer of silicon oxide ($SiO_2$) or aluminum oxide ($Al_2O_3$). These may be deposited on the substrate using chemical vapor deposition (CVD), pressure assisted chemical vapor deposition (PCVD), electron beam (eBeam) deposition, sputtering, atomic layer deposition (ALD), plasma enhanced chemical vapor deposition (PECVD), among others.

Figure 2H:
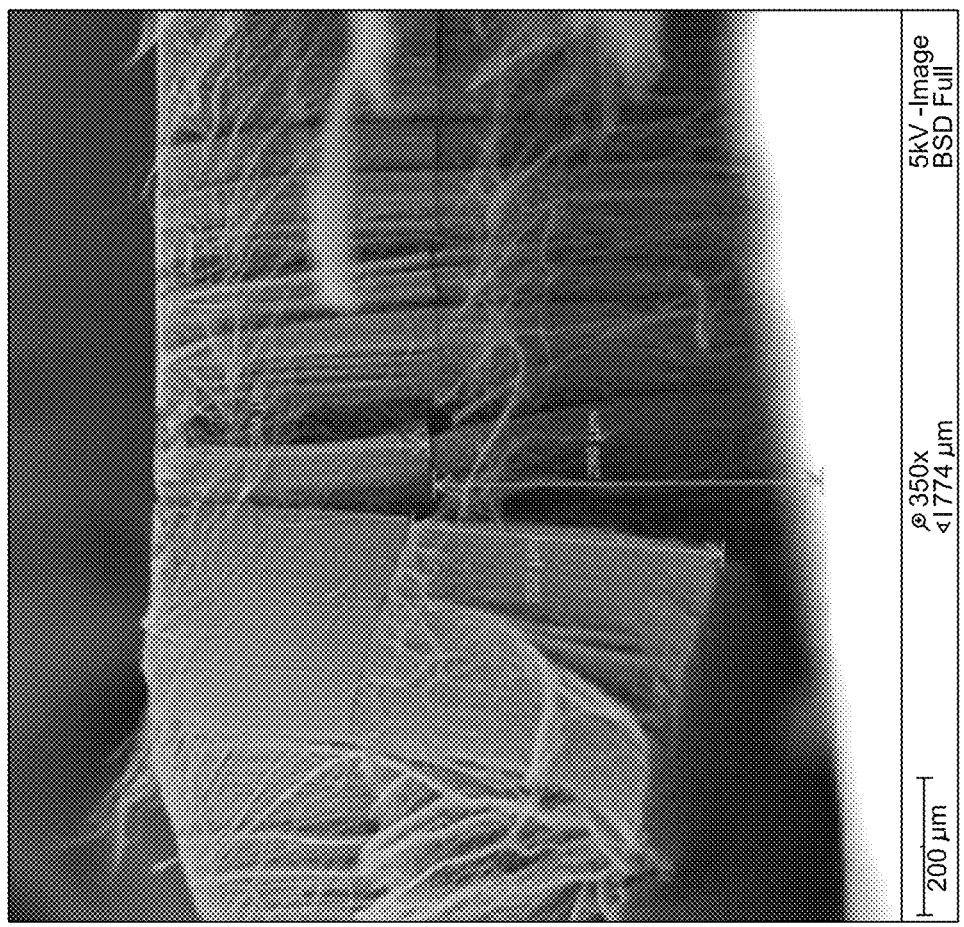
FIG. 2H is an SEM image of an example multi-layered carbon nanotube forest, in an embodiment.
Figure 2G:
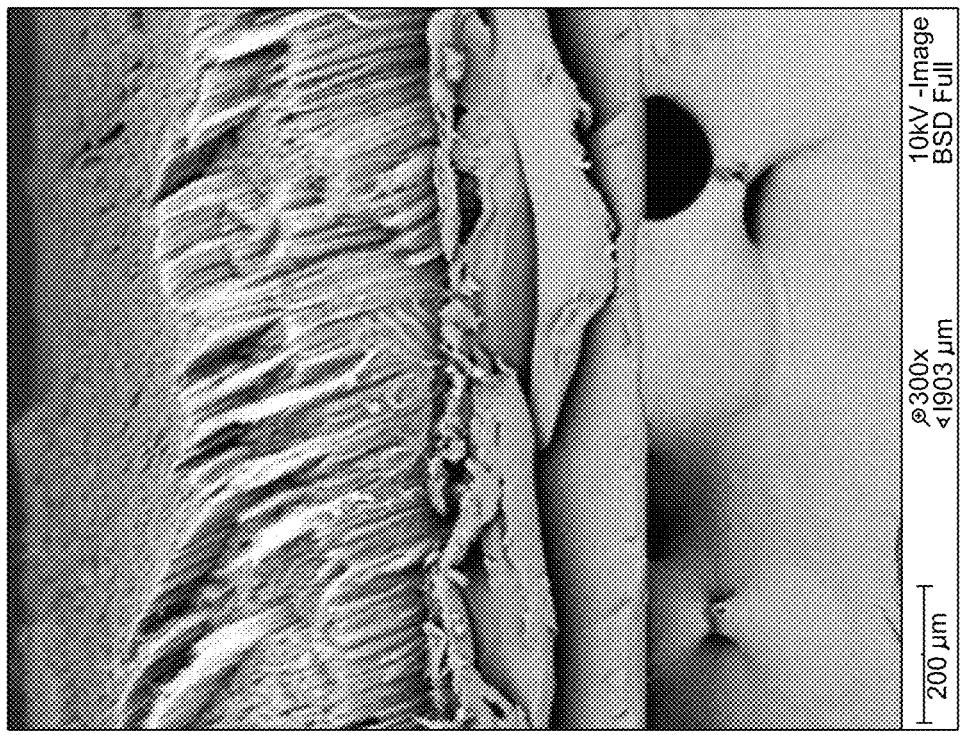

In some particular embodiments, multiple nanofiber forests (or "layers") may be sequentially grown on the same substrate to form a multilayered nanofiber forest, alternatively referred to as a "stack." An example multi-layered nanofiber forest is shown in FIG. 2H, and is described below in more detail. In this process, one nanofiber forest is formed on the substrate followed by the growth of a second nanofiber layer in contact with the first nanofiber layer. Multi-layered nanofiber forests can be formed by numerous suitable methods, such as by forming a first nanofiber forest on the substrate and growing a second forest on the same substrate underneath the first forest or by depositing catalyst on the first nanofiber forest and then introducing additional fuel compound to the reactor to encourage growth of a second nanofiber forest from the catalyst positioned on the first nanofiber forest.

After formation, the nanofiber forest may optionally be modified. For example, in some embodiments, the nanofiber forest may be exposed to a treatment agent such as an oxidizing or reducing agent. In some embodiments, the nanofibers of the forest may optionally be chemically functionalized by a treatment agent. Treatment agent may be introduced to the nanofiber forest by any suitable method, including but not limited to chemical vapor deposition (CVD). In some embodiments, the nanofiber forest may be modified to form a patterned forest. Patterning of the forest may be accomplished, for example, by selectively removing nanofibers from the forest. Removal can be achieved through chemical or physical means.

This process of fabricating 304 a forest can be repeated at least once (with an intervening air and/or hydrogen reduction step to reduce the catalyst) to fabricate a nanotube stack having at least two layers of nanofibers, in which the nanofibers within each layer are substantially aligned. Depending on the growth methodology applied, the type of catalyst, and the location of the catalyst, the second nanofiber layer may either grow on top of the first nanofiber layer or, after refreshing the catalyst (e.g., by exposing it to hydrogen gas), grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered forest may include two, three, four, five or more forests. In differing embodiments, the nanofibers in each forest of the stack may be either in alignment or out of alignment with those in other forests of the stack. A two layered nanofiber forest is, as indicated above, shown in FIG. 2H along with the observable interface between the two nanofiber layers of the stack. An illustration of an embodiment of a two layer nanofiber forest 400 is shown in FIG. 4A.

As shown in FIG. 4A, a nanofiber layer (or equivalently a nanofiber forest) 404A is disposed on a growth substrate 402. Nanofiber layer 404B is disposed on a surface of arcuate potions of nanofibers of the nanofiber layer 404A. As is shown, this surface of arcuate portions of the layer 404A is opposite the growth substrate 402. This configuration is consistent with the preceding explanation of nanofiber layers in their as-deposited state.

Having thus fabricated the two layer nanofiber forest 400 on the growth substrate 402, FIG. 4B illustrates a first adhesive substrate 408 that is applied 308 to the exposed surface (comprising arcuate portions) of the nanofiber layer 404B. The exposed surface of the nanofiber layer 404B is opposite the surface of the layer 404B that is in contact with nanofiber layer 404A. In examples, the first adhesive substrate 408 includes a polymer film coated with an adhesive (whether a pressure sensitive adhesive or other type of adhesive). As described elsewhere herein, the adhesive strength of the first adhesive substrate 408 can be greater than that of a second adhesive substrate eventually used to replace the growth substrate 402, as described below in more detail. In embodiments, it is the relative difference in adhesive strengths between the first adhesive substrate and the second adhesive substrate that influences the common direction that the nanofibers are ultimately oriented in relative to the surface of the substrate.

In examples, the adhesive strength of the first adhesive substrate 408 is, when measured using a 180° peel adhesion test (sold by CHEMINSTRUMENTS® of West Chester, Ohio) in the range of 2 N/25 mm to 4 N/25 mm when pulled at a rate of 5 mm/second, after having let the first adhesive substrate 408 remain in contact with the exposed surface of the layer 404B for approximately 30 minutes (to facilitate bonding). In other examples, the range of adhesive strength is in the range of 2 N/25 mm to 3 N/25 mm, 3 N/25 mm to 4 N/25 mm, or 2.5 N/25 mm to 3.5 N/25 mm. The force required to break the adhesive/nanofiber bond may be greater than the force required to break the bond between two forests of the stack or greater than the bond between the growth substrate and the forest.

As shown in FIG. 4C, a compressive force is applied 312 to one or both of the growth substrate 402 and the first adhesive substrate 408. While FIG. 4C illustrates a normal force applied 312 both of the growth substrate 402 and the first adhesive substrate 408, it will be understood that forces can be applied 312 using, for example, a roller (or rollers), plates, or other mechanisms that squeeze the growth substrate 402 and the first adhesive substrate 408 together. Furthermore, it will be understood that while a normal force is shown in FIG. 4C, the applied force can include both normal and shear components so that the individual nanofibers of each of the layers 404A and 404B (and others in embodiments with three or more nanofiber forest layers) are moved from an as-grown orientation, in which a longitudinal axis of the individual fibers is typically perpendicular to a surface of a growth substrate, to an orientation in which the longitudinal axis of the fibers is at an acute angle to or parallel with the surface of the growth substrate 402. During such a procedure, the distance between opposing substrates 402 and 408 can decrease by at least 20%, at least 30%, at least 40%, at least 50%, or at least 70%.

Regardless of the mechanism by which it is applied 312 or the relative magnitudes of compressive and shear components of the applied 312 force, the compressive force has the effect of aligning 316 the nanofibers of both layers in a common direction. One example of this is shown schematically in FIG. 4C', in which the applied 312 compressive force has aligned some or all of the individual fibers of both of the nanofiber layers 404A and 404B at an acute angle with respect to a plane of a surface of the growth substrate 402. The precise value of the acute angle at which the nanofibers of the layers 404A and 404B are disposed with respect to the surface of the growth substrate is immaterial except that it should be a lower value (e.g., having a component that is closer to 0° or in other words, parallel to the surface of the growth substrate 402) than the ultimately desired orientation of the fibers in the final nanofiber sheet.

Figure 4D:
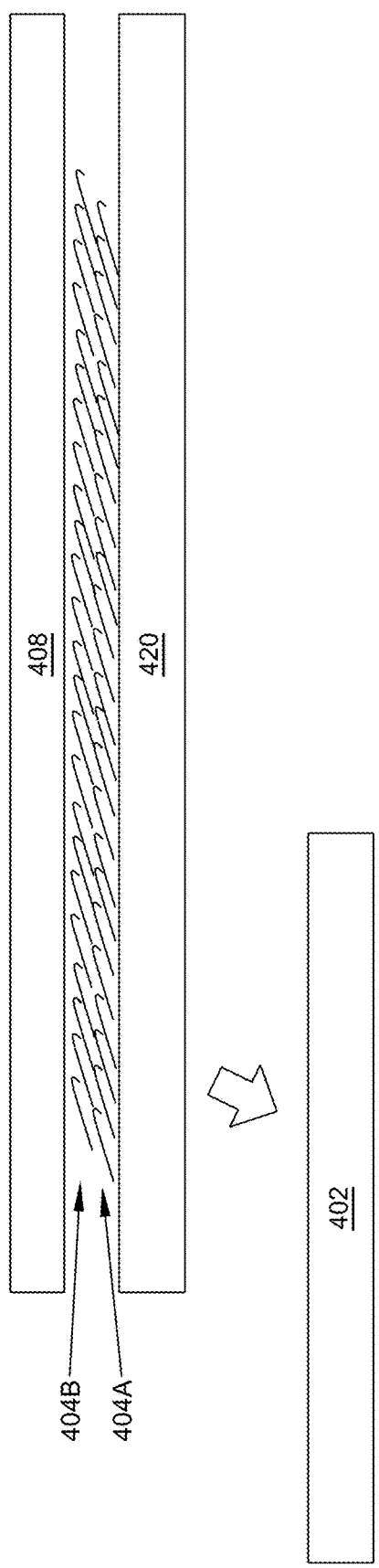

As illustrated in FIG. 4D, the growth substrate 402 is then removed 320 and a second adhesive substrate 420 is applied 320 to the surface of the first nanofiber layer 404A exposed by removal of the growth substrate 402. The adhesive strength of the second adhesive substrate 420 is selected according to an orientation of the nanofibers desired for the final nanofiber sheet. For example, a second adhesive substrate 420 having an adhesive strength less than that of the first adhesive substrate 408 but in the range of 0.1 N/25 mm to 0.5 N/25 mm will adhere to the layer 404A so that the fibers of the layers 404A and 404B are pulled approximately perpendicular to the surfaces of the adhesive substrates 408 and 420. Other ranges of adhesive strengths will also facilitate this orientation, including from 0.1 N/25 mm to 0.4 N/25 mm, from 0.1 N/25 mm to 0.2 N/25 mm, from 0.2 N/25 mm to 0.3 N/25 mm, from 0.2 n/25 mm to 0.4 N/25 mm, and from 0.3 n/25 mm to 0.5 N/25 mm. It will be appreciated that while an upper limit of 0.5 N/25 mm is described, adhesives with even higher adhesive strengths can be used. As will be explained below in more detail, it is the relative strength between the adhesive of the first adhesive substrate relative to the adhesive of the second adhesive substrate that determines the orientation of the fibers after separating the two adhesive substrates.

In another example, a second adhesive substrate 420 having an adhesive strength that is an order of magnitude lower than those described above will facilitate orientation of the fibers at an acute angle greater than the angle achieved after the compressive force is applied (as shown in FIG. 4C') but less than the perpendicular configuration described immediately above. For example, adhesive strengths in the range of 0.01 N/25 mm to 0.05 N/25 mm will produce this orientation of nanofibers in the sheet. Other ranges of adhesive strengths appropriate for this orientation include 0.01 N/25 mm to 0.02 N/25 mm, 0.01 N/25 mm to 0.04 N/25 mm, and 0.02 N/25 mm to 0.03 N/25 mm.

Because it is the relative strength of the adhesives that determines the orientation of the nanofibers, the adhesive strength of the first adhesive substrate 408 and the second adhesive substrate 420 can be selected based on their relative strengths. For example, a ratio of an adhesive strength of the first adhesive substrate 408 compared to the second adhesive substrate 420 can be greater than 1:1 and specifically in a range from 4:1 to 400:1. The orientation of the fibers for different ratios is understood based on the descriptions presented above.

Figure 4E:
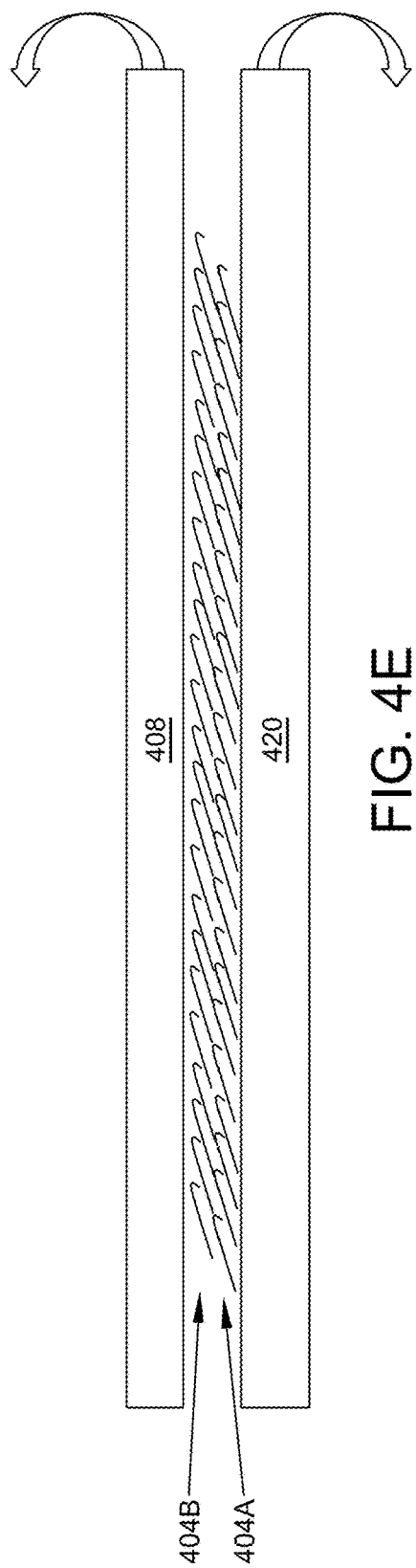

As shown in FIG. 4E, the first adhesive substrate 408 and the second adhesive substrate 420 are pulled apart 324, as indicated by the arrows in FIG. 4E. Pulling apart 420 the first adhesive substrate 408 and the second adhesive substrate 420 exposes the straight portion of the nanofibers of the first nanofiber layer 404A and the second nanofiber layer 404B. Nanofiber layers oriented to have an exposed surface composed of open ends, as shown forest 404B of FIG. 4F, have unexpected optical properties including light absorbency that can be at least 97%, and in some cases, at least 99%, at least 99.95%, and/or at least 99.96% of incident light. As indicated above in the context of FIG. 4D, the adhesive strength of the second adhesive substrate changes the angle with which the individual nanofibers of the layers are oriented (with respect to a corresponding underlying substrate) as the two layers are pulled apart 324.

FIG. 4F illustrates one embodiment in which an adhesive strength of the second adhesive substrate 408 is in the range of, for example, 0.1 N/25 mm to 0.5 N/25 mm, as described above. As indicated above, a substrate having an adhesive strength in this range separates the nanofiber layer 404B from the nanofiber layer 404A, while also providing enough adhesive strength to re-orient the individual nanofibers from a "flattened" orientation (as shown in FIG. 4D) to an orientation in which the nanofibers are approximately perpendicular to a surface of the first and second adhesive substrates 408 and 420. This has the effect of exposing the straight ends of the individual nanofibers of the layer 404A and thus producing a layer having unexpected optical properties, as described above. The surface of the layer 404A composed of arcuate ends of individual nanofibers is exposed also. In this embodiment, the adhesive strength of each of the substrates is greater than then adhesive strength that binds the two nanofiber layers together.

FIG. 4G illustrates one embodiment in which an adhesive strength of the layer 408 is in the range of 0.01 N/25 mm to 0.05 N/25 mm. As indicated above, an adhesive strength in this range is sufficient to remove both of the nanofiber layers 404A and 404B from the second adhesive substrate 420, and partially re-orient the individual nanofibers of multiple forests from a "flattened" orientation (as shown in FIG. 4D) to an acute angle with the surface of the substrate 408 that is greater than the angle between the nanofibers and the surface of the substrate 408 in the "flattened" configuration. However, the adhesive strength of the second adhesive substrate 420 is insufficient to maintain a connection with the first layer of nanofibers 404A so that the nanofibers of both layers can be pulled into the multi-forest configuration shown in FIG. 4G.

Figure 4H:
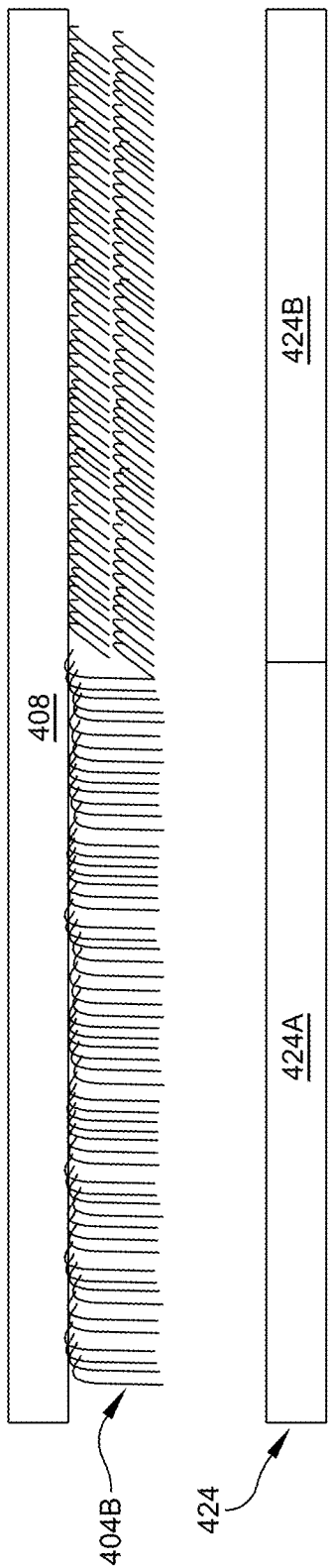

FIG. 4H illustrates another embodiment in which the adhesive strength of a second adhesive substrate 424 is patterned. In this context, patterning an adhesive of the second adhesive substrate 424 includes varying an adhesive strength as a function of location on the surface of the second adhesive substrate 424. In this example, the adhesive strength of the second substrate 424 has a strongly adhesive portion 424A and a weakly adhesive portion 424B. When prepared according to the method 300, the nanofiber layer 404B is patterned in orientations corresponding to the adhesive strength of the different portions 424A and 424B of the second adhesive substrate 424. That is, the nanofibers previously attached to the strongly adhesive portion 424A are in an orientation that is approximately perpendicular to the surface of the underlying first adhesive substrate 408. The nanofibers previously attached to the weakly adhesive portion 424B of the second adhesive substrate 424 are oriented at an acute angle to the surface of the first adhesive substrate 408. The example illustrates that the orientation of the nanofibers of a layer, and the corresponding optical properties of the layer, can be selected based on a pattern of varying adhesive strengths of the second adhesive substrate.

In other embodiments, patterning of a nanofiber forest can be accomplished by using a growth substrate having a pattern on a surface (e.g., different surface energies, reflectivities, surface roughness, chemical activity), a pattern of catalyst (e.g., varying a density of catalyst particles as a function of location) on the growth substrate, and combinations thereof. These may also be combined with patterns of adhesive strength on any of the adhesive substrates described herein. Regardless of how the pattern is introduced or on what substrate the pattern is disposed, patterning as described herein can be used to control a pattern of nanofiber density and/or orientation on a substrate.

It will be appreciated that the first and second adhesive substrates 408, 420, and 424 may be instantiated in any of a variety of forms. Adhesive substrates may be flexible or rigid. As used herein, flexible substrates are those that can be rolled into a cylinder having a diameter of less than 10 cm. In some embodiments, polymer films coated in one or more adhesives may be used as some embodiments of the substrates 408 and 420, 424. The polymer films can be selected according to any of mechanical, electrical, or optical properties that are desired, whether tensile strength, optical clarity, fracture toughness, elasticity, conductivity, or some other property. In other embodiments, a rigid polymer, metallic, ceramic, or composite substrate may first be coated with an adhesive (whether a "100% solids" adhesive or a pre-adhesive component that is reacted in situ to form an adhesive) and then used to orient the nanofibers of the various nanofiber layers, as described herein. In other embodiments, the substrate itself is adhesive and a secondary adhesive layer is not required. Regardless of the instantiation used, the adhesive ranges described herein still apply.

Figure 4I:
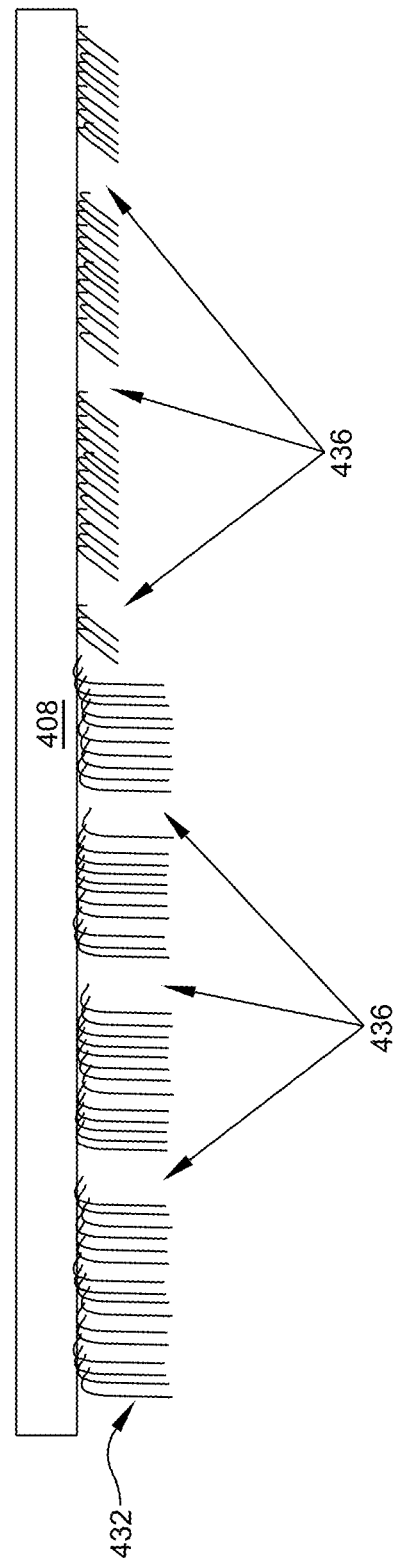
FIG. 4I schematically illustrates a nanofiber sheet in which a nanofiber layer on the sheet is patterned, in an embodiment.
Figure 4J:
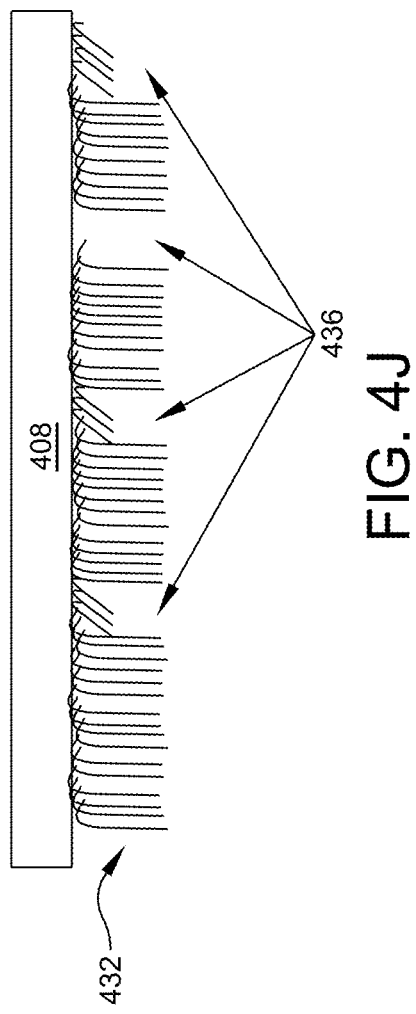
FIG. 4J schematically illustrates a nanofiber sheet on which is disposed a printed pattern, in an embodiment.

FIG. 4I illustrates an embodiment in which a nanofiber layer 432 is disposed on the substrate 408 in a pattern. Patterning a nanofiber layer 432 enables selective use of the various properties of the nanofiber layer 432. The embodiment of the pattern shown is one in which the layer 432 of nanofibers includes areas 436 that lack nanofibers. Embodiments of the methods described above can be adapted to produce such a pattern by adjusting either (1) an adhesive strength of one or both of the substrates or by adjusting (2) a ratio of the relative adhesive strengths of the substrates. For example, the adhesiveness of one substrate can be patterned so that nanofibers initially disposed in the layer 436 are removed from the layer 436 at locations corresponding to the areas 436. In still other embodiments, it will be appreciated that the adhesive strength (whether absolute value or ratios thereof) can be patterned to generate a layer of nanofibers that is continuous and has areas 436 of nanofibers in different orientations. Alternatively, the pattern shown in FIG. 4I can be created by patterning a catalyst on a growth substrate to prevent nanofiber growth in some portions of the substrate. In still further examples, such as the one shown in FIG. 4J, a pattern can include areas 436 of nanofibers in different orientations as well as areas 436 in which nanofibers are absent.

Figure 4K:
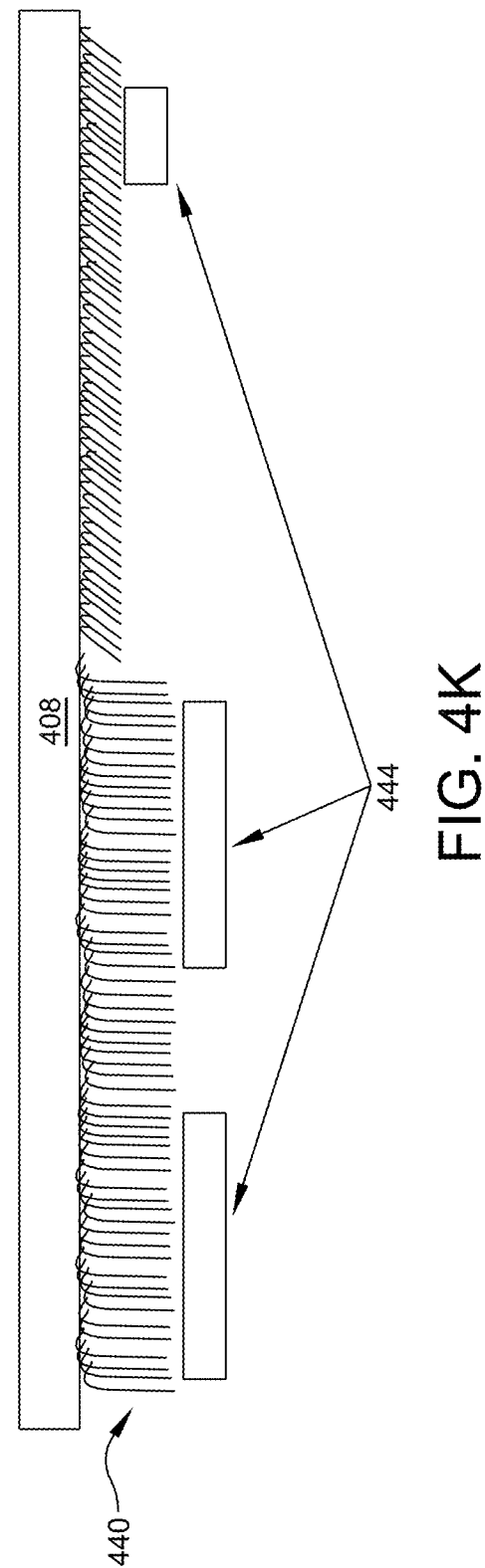
FIG. 4K illustrates a top layer printed on a patterned layer of nanofibers, in an embodiment.

FIG. 4K illustrates an embodiment in which a top layer 444 is printed on a patterned layer 440 of nanofibers. This top layer 444 is another method by which a pattern can be imposed on a nanofiber layer, thereby selecting an extent to which the unusual properties of the nanofiber layer 440 are exhibited. Any printing technology (e.g., ink jet, photolithography, among others) can be used to deposit the top layer 444 on the layer 440 of nanofibers. Applications for printing the top layer 444 include depositing a reflective material (e.g., a metal) as the layer 444, thereby generating a pattern that is alternately highly light absorbent and highly reflective. Another example application includes depositing a material as the top layer 444 that has a low infra-red radiation emissivity, thereby creating a pattern that is alternately highly emissive in the IR band (corresponding to the areas of the nanofiber layer 440) and negligibly emissive in the IR band (corresponding to the low emissivity material in the top layer 444).

In still further embodiments, depending on the substrate selected, the oriented layers may be wound or rolled for convenience of fabrication, shipment, or use in subsequent manufacturing processes. In still other embodiments, the first adhesive substrate can include a double-sided adhesive tape.

Examples of Specular Reflections of Oriented Nanofiber Sheets

Figure 5A:
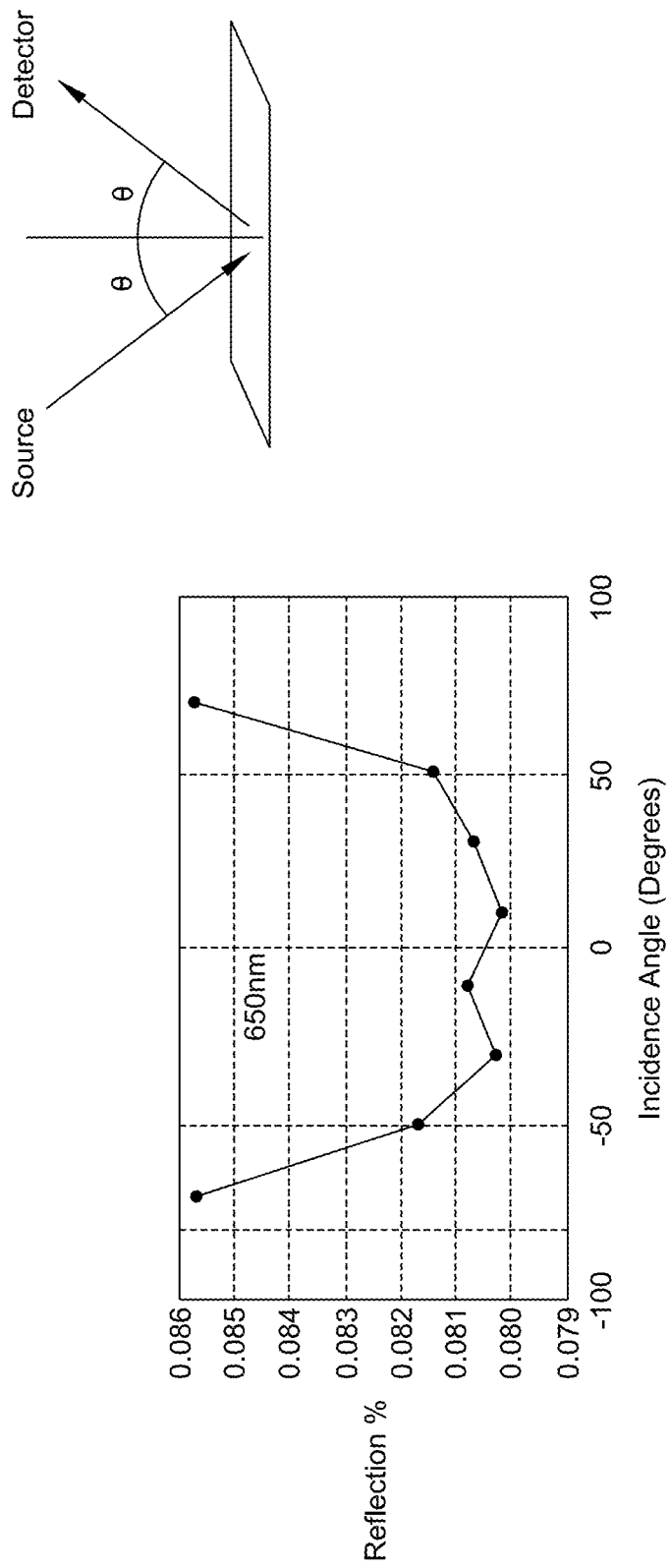
FIG. 5A is reflectance data of a reference carbon nanotube forest in which the individual nanotubes are in their as-deposited form, in an embodiment.

As indicated above, the reflectivity of embodiments of the present disclosure is unusually low with some embodiments reflecting far less than 1%, 0.5%, or 0.1% of incident light, and in some cases less than 0.05% of incident light. FIG. 5A illustrates reflection data for a nanofiber forest in its as-deposited form on the growth substrate on which the forest was grown. FIG. 5C corresponds to an oriented nanofiber forest disposed on the growth substrate on which it was grown, except that the forest has been angled 30° with respect to a surface of the underlying substrate in accordance with embodiments of the present disclosure. The reflectivity measurements were performed for all samples using 650 nm wavelength light and were measured over a range of incidence angles, as indicated in each of FIGS. 5A to 5D. Furthermore, the configuration of the light "source" and the "detector" with respect to the sample are also shown in each of the corresponding figures.

FIG. 5A is reference reflectivity data for a nanofiber sheet prepared by growing a nanofiber forest on a growth substrate, using techniques disclosed in for example PCT Patent Application Publication No. WO2007/015710. Unlike the sheet corresponding to the data shown in FIG. 5B, the forest corresponding to the data of FIG. 5A was not removed from its growth substrate. The longitudinal axes of the fibers are approximately 90° to a surface of the underlying growth substrate. Arcuate ends of the nanofibers of the forest are at an exposed surface of the forest, as described above. The reflectivity data corresponds to 650 nm wavelength light.

As shown, the percentage of reflected light ranges from 0.085% for light shown at angles in the range of +/−60° relative to an axis normal to the underlying substrate (as shown in the inset of FIG. 5A) to a minimum of approximately 0.08% for light shown approximately 0° relative to an axis normal to the underlying substrate. As is shown, the percentage of light reflected increases the greater the angle between the longitudinal axes of the nanofibers and the incident light. Although even at large angles to the surface the percent of light reflected is still quite low.

FIG. 5B shows reflectivity data for a carbon nanofiber forest prepared according to embodiments of the present disclosure. Specifically the carbon nanofiber forest corresponding to the data of FIG. 5B has been removed from its growth substrate using an adhesive sheet and oriented so that open ends the carbon nanofibers of the forest are disposed at an exposed surface of a nanofiber layer, and longitudinal axes of the fibers are approximately 90° to a surface of the underlying growth substrate, using methods described herein. As shown, even though the orientation of the nanofiber layer of FIG. 5B was approximately the same as that of the nanofiber layer of FIG. 5A (i.e., the longitudinal axes of the layers are approximately normal to an underlying substrate surface and approximately parallel to a direction of incident light), the percentage of light reflected by the sample corresponding to FIG. 5B ranged from 0.053% to 0.58%. These values are unexpectedly nearly 30% lower than the conventionally prepared sample of FIG. 5A.

As also shown, the experimental results of FIG. 5B show a minimum reflectance value of approximately 0.049% compared to a corresponding minimum value in FIG. 5A of 0.08%. In other words, the minimum reflectance value of the sample corresponding to FIG. 5B (and prepared according to embodiments of the present disclosure) is unexpectedly nearly half the minimum reflectance value of the conventionally prepared nanofiber forest. Thus, the absorbance of light (in this case visible light having a wavelength of 650 nm) is at least 99.96%.

In other words, the difference in fabrication methods used to produce the samples of FIGS. 5A and 5B generated an unexpected drop in reflectance for the sample examined in FIG. 5B.

FIG. 5C shows reflectance data of a reference carbon nanotube forest in which the nanotubes are disposed on their growth substrate and oriented 30° with respect to a surface of the substrate, in an embodiment of the present disclosure. As shown, a minimum reflectance is between 0.29% and 0.30% at an angle of incidence of incident radiation of 650 nm. Also noteworthy is the relatively low dependence of reflectance on the angle of incidence of the incident radiation and the symmetric nature of reflectance on angle of incidence FIG. 5A. At angles of incidence that do not align with the 30° angle of nanotubes on the substrate, the reflectance rises to over 0.33%.

Figure 5D:
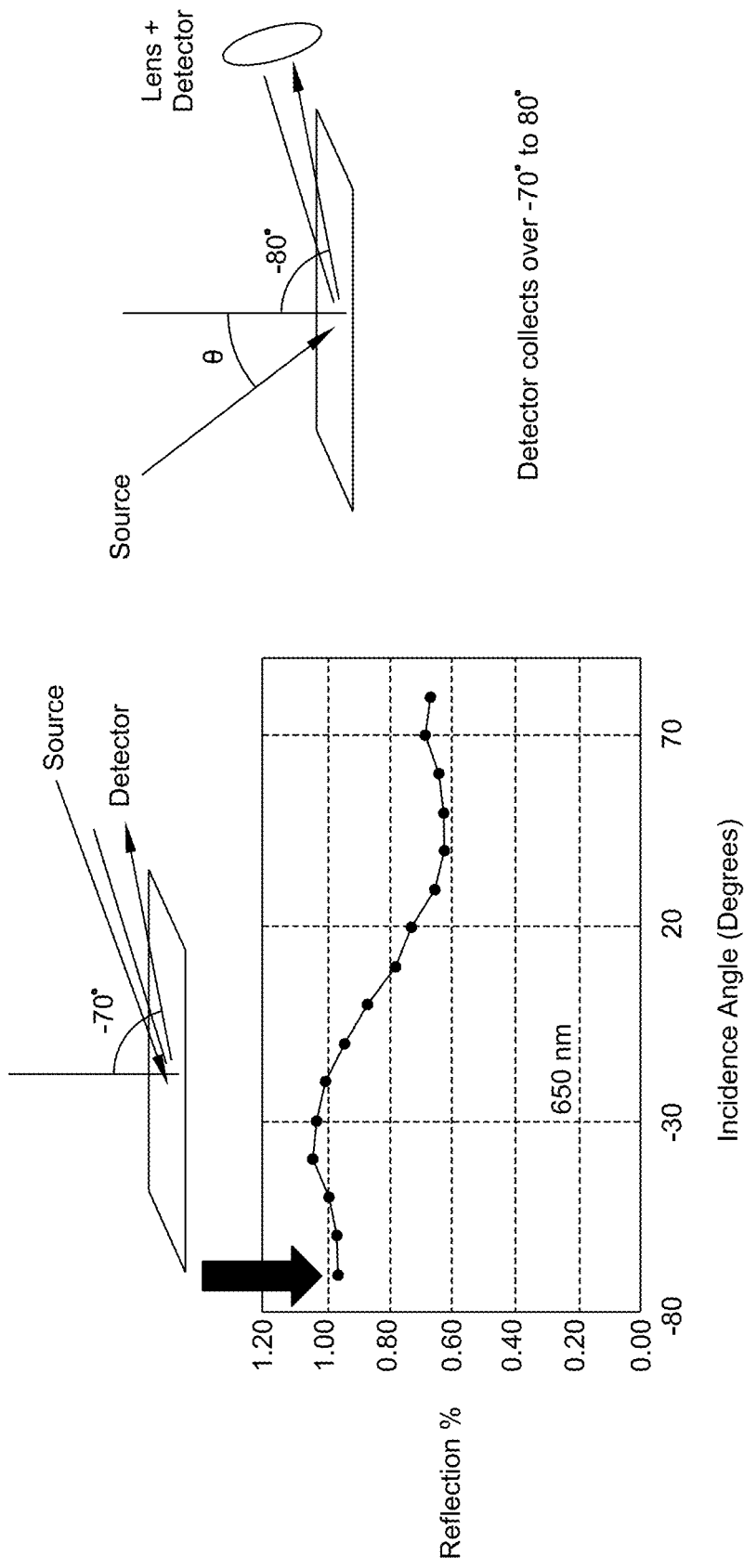
FIG. 5D is reflectance data of a carbon nanotube forest prepared according to embodiments of the present disclosure, for which open ends of the nanofibers are located at an exposed surface of the forest and are oriented at approximately 30° to an underlying substrate, in an embodiment.

FIG. 5D is reflectance data of another carbon nanotube forest prepared according to embodiments of the present disclosure, for which open ends of the nanofibers are located at an exposed surface of the forest and are oriented at approximately 30° to an underlying substrate, in an embodiment. As shown reflectance is still quite low, at less than 1% for most angles of incidence of the light. As is also apparent for this sample, the angular dependence on reflectivity is not as strong as the sample exhibited in FIG. 5C.

Figure 6A:
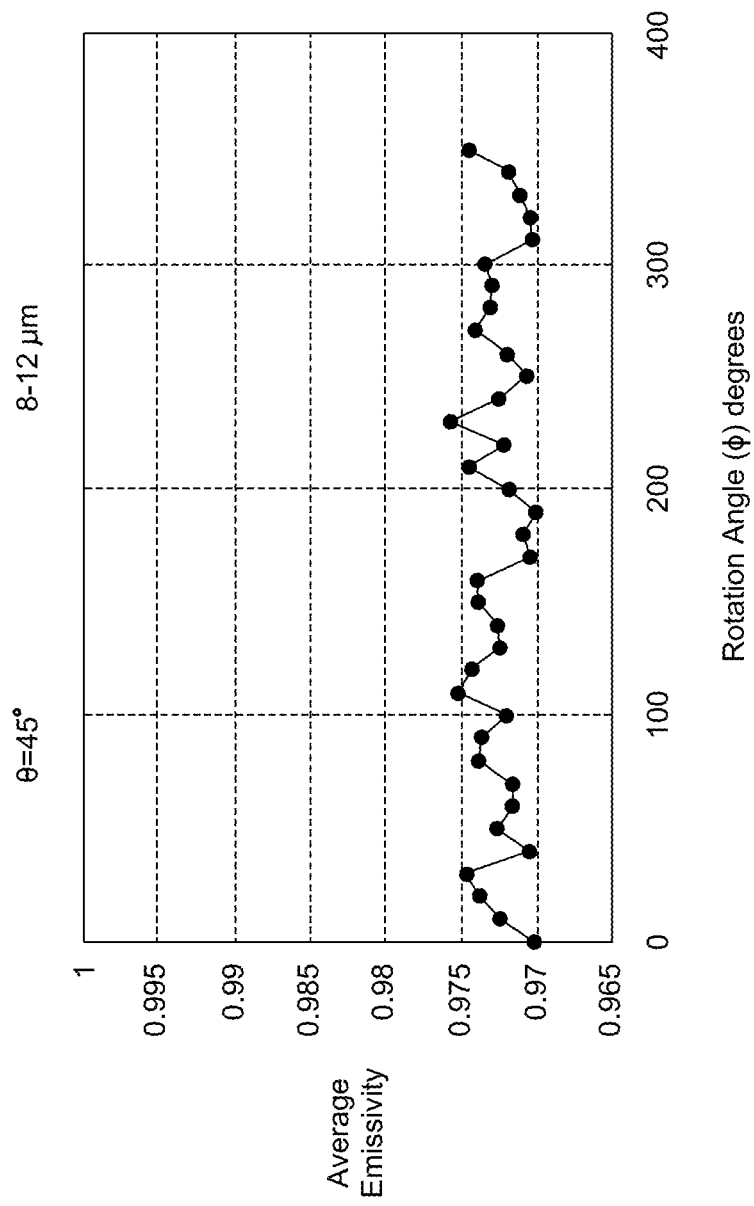
FIG. 6A is emissivity data of a reference carbon nanotube forest, and for which the individual nanofibers are approximately perpendicular to an underlying growth substrate with open ends placed at an exposed surface by manually re-orienting the forest.

FIG. illustrates is infra-red (IR) emissivity data of a reference carbon nanotube forest fabricated on a growth substrate and manually "flipped" from its as-deposited form (arcuate ends at an exposed surface). Using tweezers, the forest was removed from the growth substrate and re-oriented so as to place open ends of the nanofibers of the forest at an exposed surface and arcuate ends of the nanofibers proximate to the growth substrate. To measure the IR emissivity for wavelengths of between 8 µm and 10 µm, the reference sample was placed on a hot plate having a rotating heating stage and heated to a surface temperature of 60° C. The sample and heat stage were rotated, and the emissivity of the sample measured as a function of rotation angle. The emissivity detector was disposed at an angle of 45° with respect to a surface of the sample, as shown in FIG. 6A. The emissivity detector was calibrated with ε=0.1 and ε=0.9 standards. As shown, the emissivity for this reference sample was between 0.97 and 0.975.

Figure 6B:
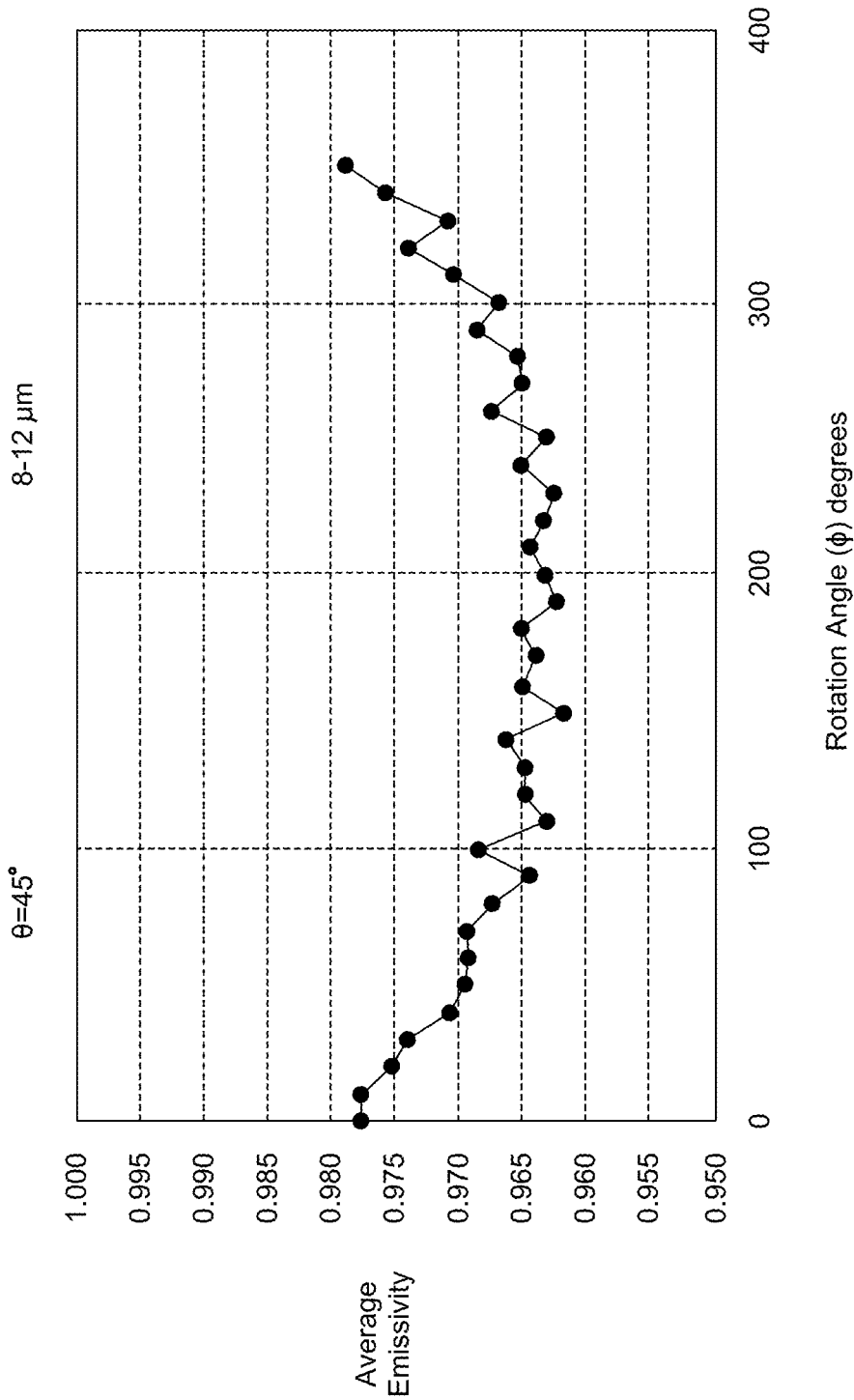
FIG. 6B is emissivity data of a carbon nanotube forest prepared according to embodiments of the present disclosure, for which the open ends of nanofibers are located at an exposed surface of the forest and are also approximately perpendicular to an underlying substrate, in an embodiment.

FIG. 6B illustrates emissivity data for a sample prepared according to embodiments of the present disclosure for which open ends of the nanofibers are disposed at an exposed surface of the layer using the method 300 and shown in FIGS. 4A-4G, in embodiments. The emissivity data of the sample corresponding to FIG. 6B was measured under the same conditions (60° C. temperature, calibrated with ε=0.1 and ε=0.9 standards, by an emissivity detector is disposed at an angle of 45° with respect to a surface of the sample) as the reference sample corresponding to the data shown in FIG. 6A. As shown, the emissivity for this sample is as high as 0.980 for some angles. Generally, the emissivity for this sample prepared according to embodiments of the present disclosure is comparable to that of the reference sample of FIG. 6A. It will be appreciated that using embodiments of the present disclosure to prepare a nanofiber forest with open ends of the nanofibers oriented at an exposed surface is far more efficient and productive than manually flipping a forest with tweezers, as was the case for the sample corresponding to FIG. 6A. The convenience of embodiments described herein combined with the production of equivalent emissivity results is a significant advantage.

Figure 7:
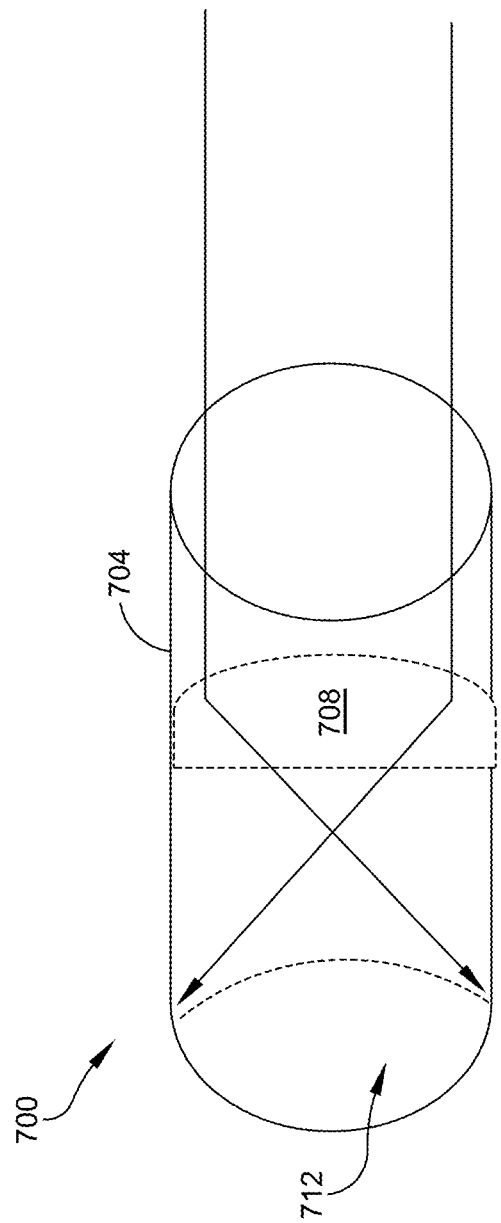
FIG. 7 schematically illustrates an optical instrument, the interior of which is lined with an embodiment of the present disclosure, in an embodiment.

FIG. 7 is a schematic illustration of an optical device in which the removal of extraneous light reflected within the device improves the functioning of the optical device. Examples of the optical device 700 can include telescopes and microscopes, among others. In this schematic example, the optical device 700 includes an optical tube 704, a lens 708, and a light absorbent lining 712 fabricated according to embodiments described herein.

As shown, light enters the optical tube 704, is diffracted by the lens 708 and strikes an inner surface of the optical tube 704 that is covered by the light absorbent lining 712. In conventional optical devices, light contacting a metallic, plastic, or composite inner surface of the optical tube 704 would be, in part, reflected within the chamber defined by the optical tube 704. This reflection would reduce signal to noise ratio, thus degrading the performance (and/or resolution) of the optical device. However, because of the light absorbent lining 712, this light is absorbed thus improving the performance (and/or resolution) of the optical device 700. It will be further appreciated that the light absorbent lining 712 is used in some examples to cover structural elements within in the optical tube, such as fixtures for lenses, baffles, electronics and electronics housings, gears and rails used for the translation and/or rotation of elements of the optical device 700, among structures commonly found in optical devices.

Furthermore, because embodiments of the present disclosure can absorb frequencies of radiation beyond the visible spectrum (e.g., IR, UV, radio frequency, microwave), other devices may benefit from the inclusion of a lining similar to the light absorbent lining 712 shown in FIG. 7.

FIG. 8 is a flow diagram illustrating an example method 800 for fabricating some embodiments of the present disclosure. At least one layer of nanofibers is provided 804 to a substrate. The at least one layer can include one, two, three, or more layers of nanofibers. Examples of substrates include growth substrates and adhesive substrates, as described above.

A layer of the at least one layer of nanofibers provided to the substrate are then configured 808 so that open ends of the nanofibers of the layer are disposed at an exposed surface of the layer. This can be accomplished using any of the techniques described above. For example, an adhesive substrate can be placed on top of the at least one layer and then be separated from the substrate on which the at least one layer was provided. Depending on the relative adhesive strengths of the adhesive substrate and the substrate on which the at least one layer was provided, arcuate ends can be removed from straight portions of the nanofibers, thus exposing open ends of the nanofibers. Or, for a multi-layer stack, nanofibers can be separated from one another, exposing open ends of a nanofiber layer on the adhesive substrate.

SUMMARY

The foregoing description of the embodiments of the disclosure has been presented for the purpose of illustration;

it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method comprising:
applying a tensile force to a first substrate and a second substrate attached to opposing sides of a nanofiber forest, the applied tensile force causing the first substrate and the second substrate to separate from one another; and
responsive to the applied tensile force, causing nanofibers of the nanofiber forest to change their orientation from a first angle relative to a surface of the first substrate to a second angle relative to the surface of the first substrate greater than the first angle, wherein the second angle is from 20° to 80° with respect to the surface of the first substrate.

2. The method of claim 1, wherein a difference between an adhesive strength of the second substrate and an adhesive strength of the first substrate is 2 N/25 mm.

3. A method, comprising:
providing a layer of nanofibers on a first substrate;
applying a second substrate to an exposed surface of the layer of nanofibers;
orienting the nanofibers of the layer by applying a compressive force to the layer; and
applying a tensile force to the first substrate and the second substrate to cause the first substrate and the second substrate to separate from one another,
wherein the applied tensile force and separation of the first substrate from the second substrate causes the nanofibers of the layer to re-orient in a common direction,
wherein the layer of re-oriented nanofibers has a visible light absorbance of at least 97%.

4. The method of claim 3, wherein the first substrate is a growth substrate.

5. The method of claim 3, wherein the first substrate is a first adhesive substrate.

6. The method of claim 3, wherein the second substrate is a second adhesive substrate.

7. The method of claim 3, further comprising selecting:
an adhesive strength of the first substrate in a range of 2 N/25 mm to 4 N/25 mm; and
an adhesive strength of the second substrate in a range of 0.1 N/25 mm to 0.5 N/25 mm.

8. The method of claim 3, wherein a difference between an adhesive strength of the second substrate and an adhesive strength of the first substrate is 2 N/25 mm.

9. The method of claim 3, wherein an adhesive strength of the second substrate is greater than an adhesive strength of the first substrate.

10. The method of claim 3, wherein the common direction after being re-oriented is from 20° to 80° with respect to a surface of one of the first substrate and the second substrate.

11. The method of claim 3, further comprising:
providing a first layer of nanofibers on the first substrate and a second layer of nanofibers on the first layer of nanofibers; and
in response to the applied tensile force and the first substrate and the second substrate separating from one another, the first layer disposed on the first substrate and the second layer disposed on the second substrate.

12. The method of claim 3, wherein the layer of re-oriented nanofibers has a visible light absorbance of at least 99.96%.

13. The method of claim 12, wherein the visible light absorbed has a wavelength of 650 nm.

14. A method, comprising:
providing a layer of nanofibers on a first substrate;
applying a second substrate to an exposed surface of the layer of nanofibers;
orienting the nanofibers of the layer by applying a compressive force to the layer;
rolling the first substrate, the second substrate, and the layer of nanofibers therebetween into a roll;
selecting an adhesive strength of the first substrate in a range of 2 N/25 mm to 4 N/25 mm; and
selecting an adhesive strength of the second substrate in a range of 0.1 N/25 mm to 0.5 N/25 mm,
wherein providing the layer of nanofibers on the first substrate comprises providing a first layer of nanofibers on the first substrate and a second layer of nanofibers on the first layer of nanofibers.

* * * * *